United States Patent
Librici

(10) Patent No.: US 12,308,710 B2
(45) Date of Patent: May 20, 2025

(54) METHOD AND DEVICE FOR AUTOMATIC FORMATION OF BUNDLES OF METAL LAMINATIONS

(71) Applicant: DEMA S.R.L., Varazze (IT)

(72) Inventor: Cesare Librici, Savona (IT)

( * ) Notice: Subject to any disclaimer, the term of this patent is extended or adjusted under 35 U.S.C. 154(b) by 1139 days.

(21) Appl. No.: 17/262,544

(22) PCT Filed: Jul. 24, 2019

(86) PCT No.: PCT/IB2019/056328
§ 371 (c)(1),
(2) Date: Jan. 22, 2021

(87) PCT Pub. No.: WO2020/021472
PCT Pub. Date: Jan. 30, 2020

(65) Prior Publication Data
US 2021/0292108 A1    Sep. 23, 2021

(30) Foreign Application Priority Data
Jul. 25, 2018  (IT) .................. 102018000007490

(51) Int. Cl.
*H02K 15/02*    (2025.01)
*B21D 43/24*    (2006.01)
(Continued)

(52) U.S. Cl.
CPC ........... *H02K 15/02* (2013.01); *B65G 59/062* (2013.01); *B21D 43/24* (2013.01); *B65H 3/322* (2013.01); *H02K 15/021* (2025.01)

(58) Field of Classification Search
CPC .... H02K 15/02; H02K 15/024; H02K 15/028; H02K 15/021; B23D 43/24; B65G 59/062; B65H 3/322
See application file for complete search history.

(56) References Cited

U.S. PATENT DOCUMENTS 3,687,303 A    8/1972    Kramer
4,331,049 A    5/1982    Bergmann
(Continued)

FOREIGN PATENT DOCUMENTS

DE    2832210        1/1980
EP    0632567        1/1995
JP    2007282358 A  * 10/2007

OTHER PUBLICATIONS

Baloglu et al, "Numerical homogenization and simulation of a lamination stack," 2016 6th International Electric Drives Production Conference (EDPC), Nuremberg, Germany, 2016, pp. 67-72. (Year: 2016).*

*Primary Examiner* — A. Dexter Tugbang
(74) *Attorney, Agent, or Firm* — Themis Law

(57) ABSTRACT

A method for automatically forming bundles of metal laminations, adapted for armatures of electrical machines or the like, by automatic precision dosing of a lamination bundle produced by picking up and separating a preset number of laminations, includes grabbing, at one end of a lamination stack, a preset number of laminations; separating the number of laminations of the bundle from the lamination stack by axially moving the bundle away from the lamination stack by a preset distance; detaching one or more laminations, if any, at the end of the lamination bundle facing the lamination stack, which may have remained adherent to a last intended lamination by being clamped by a part of their thickness or glued to the lowest lamination of the lamination bundle; and collecting the lamination or laminations, if any, detached from the lamination stack end in a position axially aligned with the laminations of the stack.

20 Claims, 15 Drawing Sheets

(51) Int. Cl.
*B65G 59/06* (2006.01)
*B65H 3/32* (2006.01)
*H02K 15/021* (2025.01)

(56) References Cited

U.S. PATENT DOCUMENTS 4,439,100 A 3/1984 Fichtner
4,710,085 A 12/1987 Beakes
2014/0096371 A1* 4/2014 Wells .................. H02K 15/024
29/596

* cited by examiner

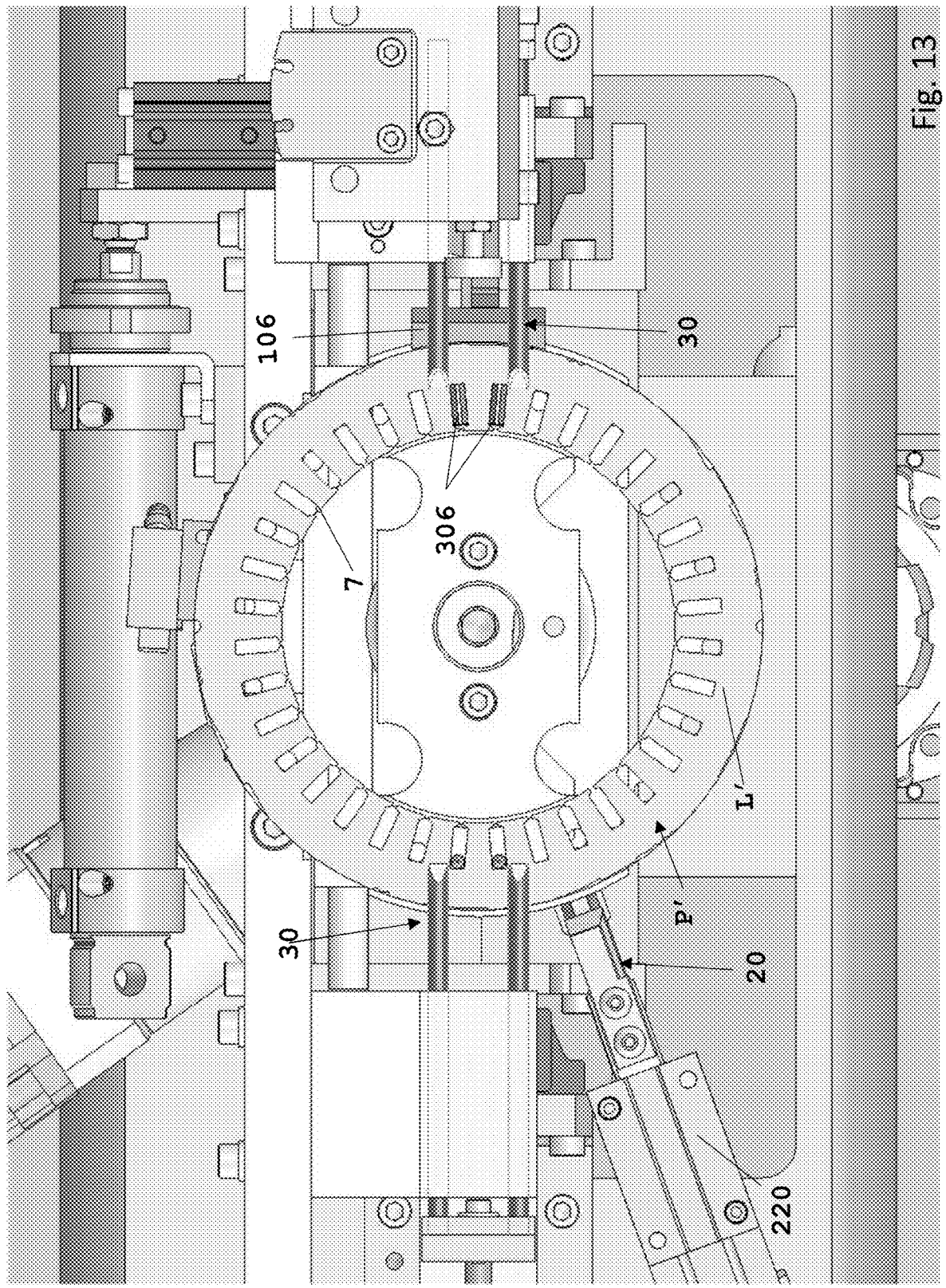

METHOD AND DEVICE FOR AUTOMATIC FORMATION OF BUNDLES OF METAL LAMINATIONS

The present invention concerns a method for the automatic formation of bundles of metal laminations, for the formation of armatures of electrical machines, or the like, by means of automatic precision dosing of a lamination bundle (p') consisting in picking up and separating a preset number of laminations, based on a preset height of the bundle (p') itself, from a lamination stack (p) higher than said bundle (p'), and comprising the following steps:

Grabbing at one end of the lamination stack (p) the preset number of laminations (L) corresponding to the height of the lamination bundle (p'), Separating said number of laminations (L) of the bundle (p') from said lamination stack (p) by axially moving the bundle (p') relatively away from the lamination stack (p) by a preset distance, Carrying out an action of detaching one or more laminations (L'), if any, at the end of said lamination bundle (p') facing the lamination stack (p), the potential last lamination or laminations having erroneously remained adherent to a lamination of the lamination bundle (p') intended to be the last lamination of said bundle, said one or more potential last laminations being precariously clamped by a part of their thickness or being moderately glued to the lowest lamination in the lamination bundle (p') though being instead intended to be the first lamination of the lamination stack facing the separated lamination bundle (p'), Collecting said lamination or laminations, if any, detached on the lamination stack end facing the bundle in a position axially aligned with the laminations of said stack (p).

A method of this type is known from the document EP0632567. The document describes a method and a device for the automatic formation of bundles of metal blanked laminations for the manufacturing of armatures of electrical machines or the like, by automatic precision dosing of the lamination bundle consisting in picking up and separating a preset number of laminations, based on a preset height of the bundle itself, from a lamination stack and being provided with a vertical store for a lamination stack that is open at the bottom and to whose lower end a picking-up bottom, which can be raised and lowered for picking up the lamination bundle, is combined. The described steps of forming the lamination bundle provide for:

Displacing the picking-up bottom in a raised position to a preset distance from the lowest lamination of the vertical lamination stack, which is restrained against a fall by gravity towards the picking-up bottom by at least one clamping gripper cooperating with the peripheral edges of one or more lowest laminations of the stack itself, said distance corresponding to a preset height of the lamination bundle to be picked up, i.e. at a certain number of laminations of the stack (p);

Opening the clamping gripper and sliding it by gravity towards the picking-up bottom for picking up the lamination stack to an extent corresponding to the preset height size of the lamination stack;

Separating the lamination bundle from the overlying lamination stack by reclosing the clamping gripper and by a first lowering of the picking-up bottom to detach the lamination bundle from the overlying stack;

Performing a detaching action of the potential last lamination of the separated bundle that remained erroneously, precariously clamped for a part of its thickness by the clamping gripper or which remained moderately glued to the lowest lamination of the lamination stack, intended to constitute the first lowest layer of a successive bundle and which thus protrudes at the bottom, at least partially beyond the lower side of the clamping gripper itself, thanks to detaching means acting directly under said clamping gripper or on said precariously and erroneously restrained lamination.

The dosing of the lamination bundle to be separated from the lamination stack is made difficult for different reasons:

A first reason consists in that the number of laminations composing the lamination bundle cannot be known for a preset height size thereof and the dividing line between the last upper lamination of the bundle to be separated and the lowest lamination of the stack constituting the first lowest lamination of the successive bundle cannot thus be determined. This is due to the thickness tolerances of the sheet from which the single laminations are blanked. Due to these tolerances of the sheet, when separating the bundle from the overlying lamination stack, the last upper lamination still belonging to the separated stack can still be precariously restrained, at the lower end of the overlying lamination stack, by means intended to lock it in the store, for example said means only being engaged for a small part of its thickness. Thus, in these conditions, the separated lamination bundle is missing a lamination and thus undersized.

A further problem consists in that the last lamination belonging to the separated bundle, and precariously restrained, can detach itself at an imprecise moment or can cause damages to and/or jam the device by falling uncontrollably.

A further reason derives from the fact that the last lamination of the separated bundle can also be precariously restrained by a moderate gluing effect or adherence due for example to the presence of blanking lubricants, oxides, annealing of the material, or other similar causes.

The solution described in the document EP0632567 perfectly solves the aforesaid problems as long as the size of the laminations remains within certain diameter limits.

When the diameter and contact surface of the single laminations increases, such as for example in the armatures of electric motors used for electrical hybrid vehicles or the like, the detaching action provided by the solution of document EP0632567 is not sufficient to ensure that the lamination(s) remain(s) erroneously combined with the bundle and that was/were spaced by the detacher finger actually separate from the lamination bundle. In fact, the action of the detacher finger takes place along an axial band of the lamination bundle which is of a relatively small angular width and when the laminations are of relatively extended sizes, the adhering force in points angularly spaced from the band of action of the detacher finger can be such as to maintain the laminations that were intended to be detached and repositioned on the stack still adherent to the bundle.

Moreover, the solution suggested in the document EP0632567 provides that the lamination bundles are selected and separated from the bottom of a lamination stack. This is disadvantageous when the weight of the laminations increases due to their increase in size.

According to a first aspect, the object of the invention is thus to improve a method for the formation of lamination bundles of the type described in the beginning that allows, with relatively simple and low-cost means, to effectively surmount the drawbacks mentioned above, so that to achieve the maximum operative speed and the maximum dosing precision of the bundle, by avoiding productive cycle interruptions and any damage to the device, also in the event of laminations of large sizes.

According to the first aspect, the object of the present invention is a method for the automatic formation of bundles of metal laminations, for the formation of armatures of electrical machines, or the like, by means of automatic precision dosing of a lamination bundle (p') consisting in picking up and separating a preset number of laminations, based on a preset height of the bundle (p') itself, from a lamination stack (p) higher than said bundle (p'), and comprising the following steps:

Grabbing at one end of the lamination stack (p) the preset number of laminations (L) corresponding to the height of the lamination bundle (p'), Separating said number of laminations (L) of the bundle (p') from said lamination stack (p) by axially moving the bundle (p') relatively away from the lamination stack (p) by a preset distance, Carrying out an action of detaching one or more laminations (L'), if any, at the end of said lamination bundle (p') facing the lamination stack (p), the potential last lamination or laminations having erroneously remained adherent to a lamination of the lamination bundle (p') intended to be the last lamination of said bundle, said one or more potential last laminations being precariously clamped by a part of their thickness or being moderately glued to the lowest lamination in the lamination bundle (p') though being instead intended to be the first lamination of the lamination stack facing the separated lamination bundle (p'), Collecting said lamination or laminations, if any, detached on the lamination stack end facing the bundle in a position axially aligned with the laminations of said stack (p), which method is characterized in that said detaching action takes place by two successive steps:

a first step of partial detachment by means of a scraping action in the direction of moving away one or more potential laminations (L') at the end of said lamination bundle (p') facing the lamination stack (p), the scraping taking place along the axial direction of the lamination bundle and at a single region of the lamination perimeter, thereby forming a gap spacing these laminations from the lamination intended to form the last lamination of the bundle (p'), the gap only partially extending along the perimetrical extent of the laminations;

a second completing step of the detachment of said one or more laminations (L') at the end of said lamination bundle (p') facing the lamination stack (p), the second completing step taking place first by introducing a separator knife between the lamination bundle (p'), i.e. between the lamination intended to form the last lamination of the bundle (p') and said one or more potential laminations (L') at the end of said lamination bundle (p') facing the lamination stack (p) in said spacing gap, and then by moving said knife along a part of the lamination perimeter.

An embodiment provides that the displacement of the knife takes place along a path corresponding to a part of the lamination perimeter, such part ranging from at least one-quarter and at most half of said perimeter extent.

In an embodiment, the method is provided in combination with laminations which have a rotationally symmetrical perimeter, in particular a circular one, and the knife path is performed along an arc of the circle coaxial to the axis of the circular shape of said laminations.

An embodiment provides that the lamination stack (p) is vertically oriented, while the lamination bundle (p') is picked up from the upper end of said stack (P), said one or more laminations (L') erroneously remained adherent to the last lamination provided for the lamination bundle (p') being collected by fall due to gravity on the upper end of the lamination stack (p).

In combination with one or more of any of the embodiments defined above, the method according to the invention can provide a further step of holding in position the last lamination of the lamination bundle (p') after the separation of the one or more potential last laminations (L') erroneously adherent against said last lamination of the lamination bundle (p').

Moreover, according to an embodiment, each lamination bundle (p') constitutes a partial bundle of the total number of laminations intended to form the armature, a plurality of said lamination bundles (p') being formed in succession and said lamination bundles (p') being stacked in mutual congruent and/or coaxial positions in order to form the completed armature.

Advantageously, according to a possible improvement, when the laminations have rotational symmetry for a predetermined rotation angle, it is advantageous that each lamination bundle (p') being overlapped on the previous bundle is rotated with respect to said previous bundle around the symmetry axis by said rotation angle or a full multiple thereof.

Object of the invention is also a device for automatically forming bundles of metal laminations, to form armatures of electrical machines, through the method according to one or more of the characteristics and embodiments previously described or sub-combinations thereof, the device comprising:

at least one vertical store for at least one stack (p) of overlapping laminations;

a sorting and separating station for a lamination bundle (p') having a predetermined number of laminations;

a translator of said lamination stack (p) with at least one end in said sorting and separating station;

said sorting and separating station comprising a gripper for radially clamping the lamination bundle (p') able to be switched alternatively in a state in which at least part of the laminations of a lamination bundle (p') are clamped and a state of not interfering with the laminations;

translators of either said clamping gripper relative to the lamination stack and/or the lamination stack relative to said clamping gripper for positioning said gripper relative to the end of said lamination stack according to the number of laminations provided for the lamination bundle (p');

a nail or a detacher/scraper finger movable along a path by which said finger or said nail separates the lamination (L') that incorrectly adheres to a lamination bundle (p') intended to be the last lamination of said bundle (p'), said one or more potential last laminations being precariously clamped by a part of their thickness or being moderately glued to the lowest lamination of the lamination bundle (p') though being instead intended to be the first lamination of the lamination stack facing the separated lamination bundle (p'), and wherein said nail or said detacher/scraper finger cooperate with an axial band of the perimeter of the laminations of the lamination bundle (p') coincident with only one point of the perimeter of said laminations, and a separator knife is provided and supported to be movable in radial direction with respect to the axis of the lamination bundle (p') or of the lamination stack (P) and in a position coincident with or placed side by side with said axial band of the lamination perimeter, and this knife is supported to be further angularly movable around the axis of the lamination bundle (p') or stack over a path along at least part of the outer perimeter of said laminations, a control unit being provided, which operates said translators, said gripper, said finger or said scraper nail and said separator knife and which runs a control program comprising instructions for carrying out the functions provided by the method according to one or more of the preceding claims.

According to an embodiment provided in combination with laminations having a plan-view shape that is inscribable in a circle, said knife is supported to be angularly movable on a path corresponding to an arc of circle coaxial with the axis of said circle.

According to an embodiment, the sorting and separating station is provided at the upper end of the lamination stack (p), at a predetermined distance therefrom.

Still according to an embodiment, the translator means of the lamination stack (P) consist of the bottom wall of the vertical store for the lamination stack, the bottom side being slidingly mounted on vertical guides and being operated by a translation actuator for sliding in vertical direction and in both ways.

Still according to an embodiment that can be provided in any combination with the preceding ones, the sorting and separating station has an upper support from which supporting arms radially depart outwards respectively of the gripper radially clamping the lamination bundle (p'), of the finger or the detacher/scraper nail and the separator knife.

In an embodiment variant, the supporting arm of the separator knife can be angularly rotated around an axis either coincident with the central axis of the lamination stack (p) or bundle (p') or parallel to an axis of the lamination stack (p) or bundle (p'), while a carriage is mounted on said arm, the carriage sliding along a slide guide oriented in the longitudinal direction of said arm, and an actuator to translate said carriage along said guide between two ending positions one of which is radially outward and in which the free tip of the knife is spaced from the shell surface of the lamination bundle (p') and the other, radially inward, in which the separator knife protrudes by a predetermined length in interposing position between two adjacent laminations of the lamination bundle (p').

In an embodiment, in which the device is intended to be used in combination with ring-shaped laminations and in which the clamping gripper of the lamination bundle (p') comprises a jaw radially outside the shell wall of said lamination bundle (p') and an opposite jaw radially inside the radially inner shell surface of the lamination bundle (p'), said two jaws having a surface that contacts the corresponding inner and outer shell surfaces and has predetermined angular length partial with respect to the angular extent of the shell surface and is correspondingly shaped, the two jaws being radially displaceable to a close position in which they clamp in-between the lamination bundle (p'), and to a position in which they are spaced from each other and from the corresponding inner and outer shell walls.

According to a further characteristic that can be provided in any combination with one or more of the preceding ones, further removable supports of the lamination stack (P) are provided, the supports being activated after both the separation stroke of the separator knife and the radial displacement of the latter away from the lamination bundle (p') have been performed, said supports consisting of at least two radial teeth arranged in different angular positions, preferably diametrically opposite with each other, with respect to the axis of the shell surface of the lamination stack (P) or bundle (p') and radially displaceable, together, by translation actuators, in overlapping position to overlap the face of the last lowest lamination of the lamination bundle (p') and in radially outward spaced position, with respect to the outer shell surface of the lamination stack (P) and/or bundle (p').

In an embodiment, said at least two radial teeth are each mounted on a radial arm and supported on slide guides fixed to said arm and oriented in the longitudinal direction of the corresponding one and are controlled in the two sliding ways along the corresponding guide by a translation actuator.

According to an embodiment variant, the grabbing gripper of the lamination bundle (p'), the nail or the detacher/scraper finger, the separator knife and the at least two removable supporting teeth of the lamination bundle (p') with their supporting arms, the translation guides and translation and rotation actuators are supported together by a common supporting frame which is mounted by means of slide guides and slide actuators so as to be displaceable between the sorting and separating station of the lamination bundle (p') and an assembling station of an armature of an electric machine, or the like, consisting of a plurality of laminations whose number is at least equal to or greater than the number of laminations provided in a bundle (p').

Advantageously, when the laminations have a rotational symmetry by a predetermined rotation angle, in order to allow, in the formation of an armature consisting of at least two lamination bundles, each lamination bundle (p') being overlapped on the previous stack is rotated with respect to said previous bundle around the symmetry axis by said rotation angle and a full multiple thereof, the assembly consisting of the gripper to grab the lamination bundle (p'), the nail or the detacher/scraper finger, the separator knife and at least two removable teeth supporting the lamination bundle (p') with the respective supporting arms, the translation guides and the translation and rotation actuators, i.e. the common supporting frame is further mounted on a motorized rotational support which is designed so as to rotate said assembly, i.e. said frame around a rotation axis coincident with the symmetry axis of the lamination bundles.

According to a further aspect, object of the invention is a plant for producing armatures of electrical machines, or the like, which operates according to one or more of the previously described steps of the method and in which a device according to one or more of the previously described combinations of characteristics is provided.

In an embodiment, the plant comprises:

a feeder for a series of lamination stacks (p) which moves said stacks (p) from a loading station of said stacks (p) to the sorting and separating station of lamination bundles (p');

transferring members to transfer the lamination bundles (p') from the sorting and separating station to an assembling station to assemble a plurality of lamination bundles (p') in an armature of electrical machines, wherein at least two lamination bundles (p') are arranged axially aligned and coincident with each other, one on top of the other, said assembling station comprising:

a store for assembling the armature, the latter consisting of at least one or more lamination bundles (p'), the store being equipped with centering guides for said laminations;

an axial presser of the laminations of the lamination bundle or bundles (p') unloaded in the store;

a tool for the stable connection of the laminations of the lamination bundles (p') preset in the assembling store and in pressed condition one with respect to the other, such as one or more welders generating one or more weld beads in axial direction of the lamination bundles (p') in the store, said one or more welders being supported so as to be displaceable along guides parallel to the axis of the lamination bundles (p') and/or on guides radial with respect to said axis, alternatively to a working distance or a standby distance;

a grabber/conveyor for unloading said lamination bundles (p') after the stable and mutual connection of the laminations with each other.

According to the present invention, in the sorting and separating station of the lamination bundles (p'), a device for the automatic formation of metal lamination bundles according to one or more of the embodiments previously described or in combinations of these embodiments is provided.

In an embodiment, the feeder of lamination stacks (p) consists of a rotary table on which a plurality of angularly equidistant vertical stores are spread, each for a lamination stack (p) whereas. in different angular positions, the rotary table transfers said stores, one by one, in a feeding/forming station to feed/form a lamination stack (p) to a store and to the sorting and separating station.

In an embodiment that can be provided in any combination with one or more of the previous embodiments, the assembling station comprises a rotary table on which a plurality of angularly equidistant assembling stores whose axis is parallel to the rotation axis of said rotary table are spread, a plurality of assembling stores for the assembly of armatures of electrical machines being formed by one or more lamination bundles (p'), each store being translated by the rotation of the table from the assembling station to an unloading station to unload the finished armature from the corresponding assembling store, the unloading station comprising grabber/translator means and being positioned at an angular position different from the assembling station with reference to the rotation of the rotary table.

The characteristics of the method, the device and the plant described above and any further characteristic, as well as advantages of the present invention, will become clearer in the following description of some exemplary embodiments shown in the accompanying drawings, in which.

Figure 8:
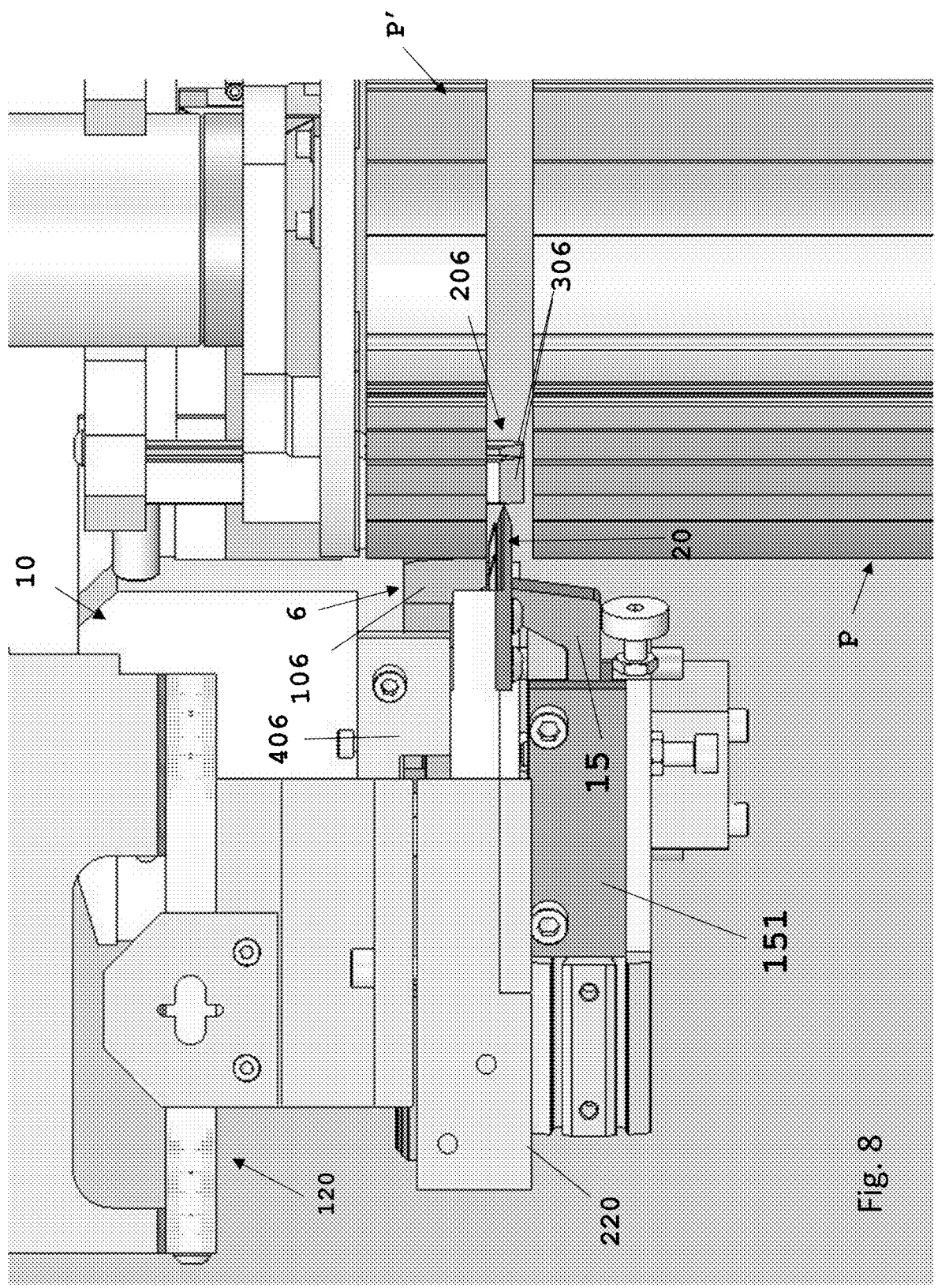
Figure 9:
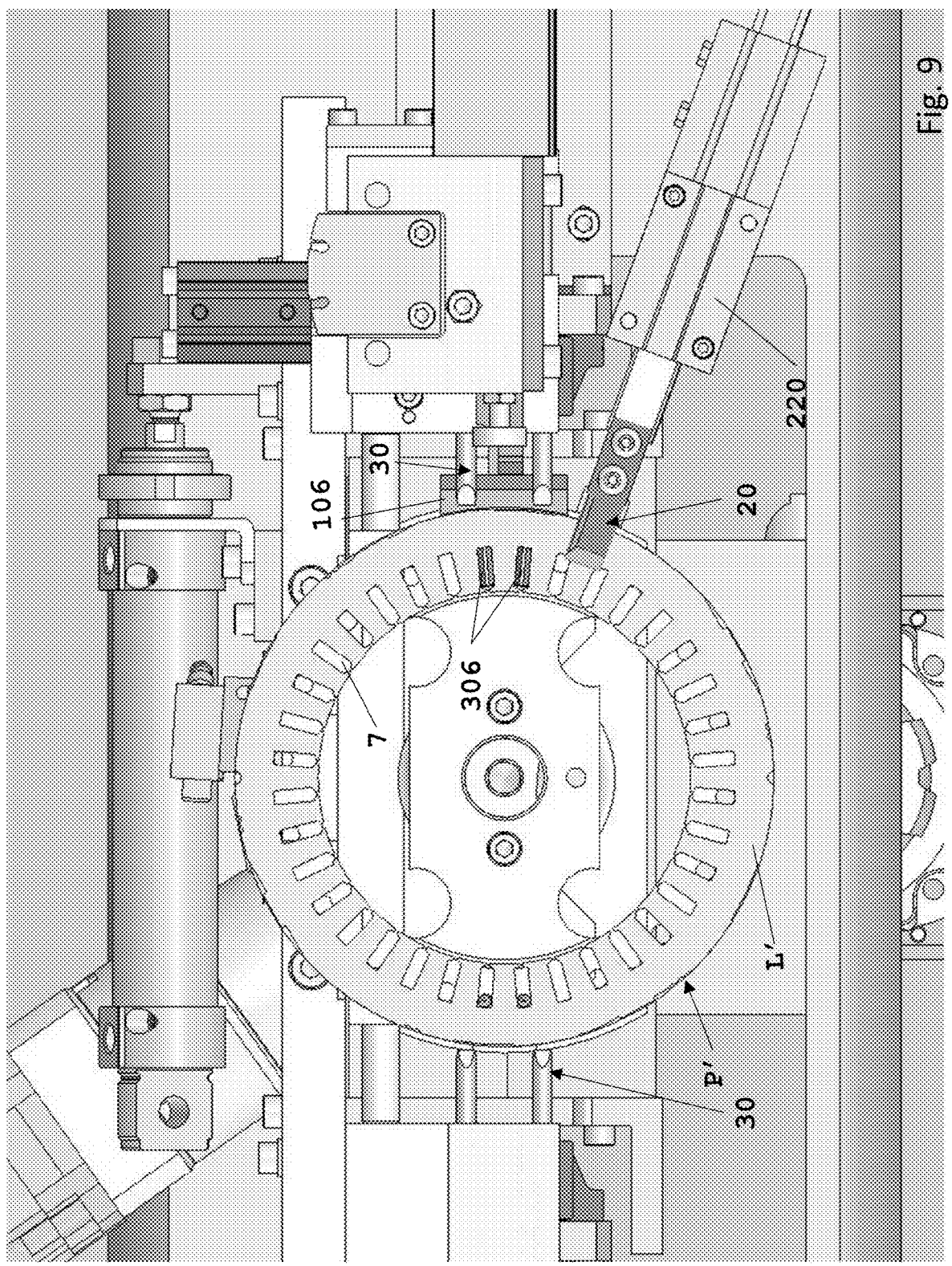

FIGS. 8 and 9 respectively show a side view and an axial view from the bottom of the step of inserting the separator knife in-between the laminations intended to return on the stack and the last lamination intended to form the lamination bundle.

Figure 10:
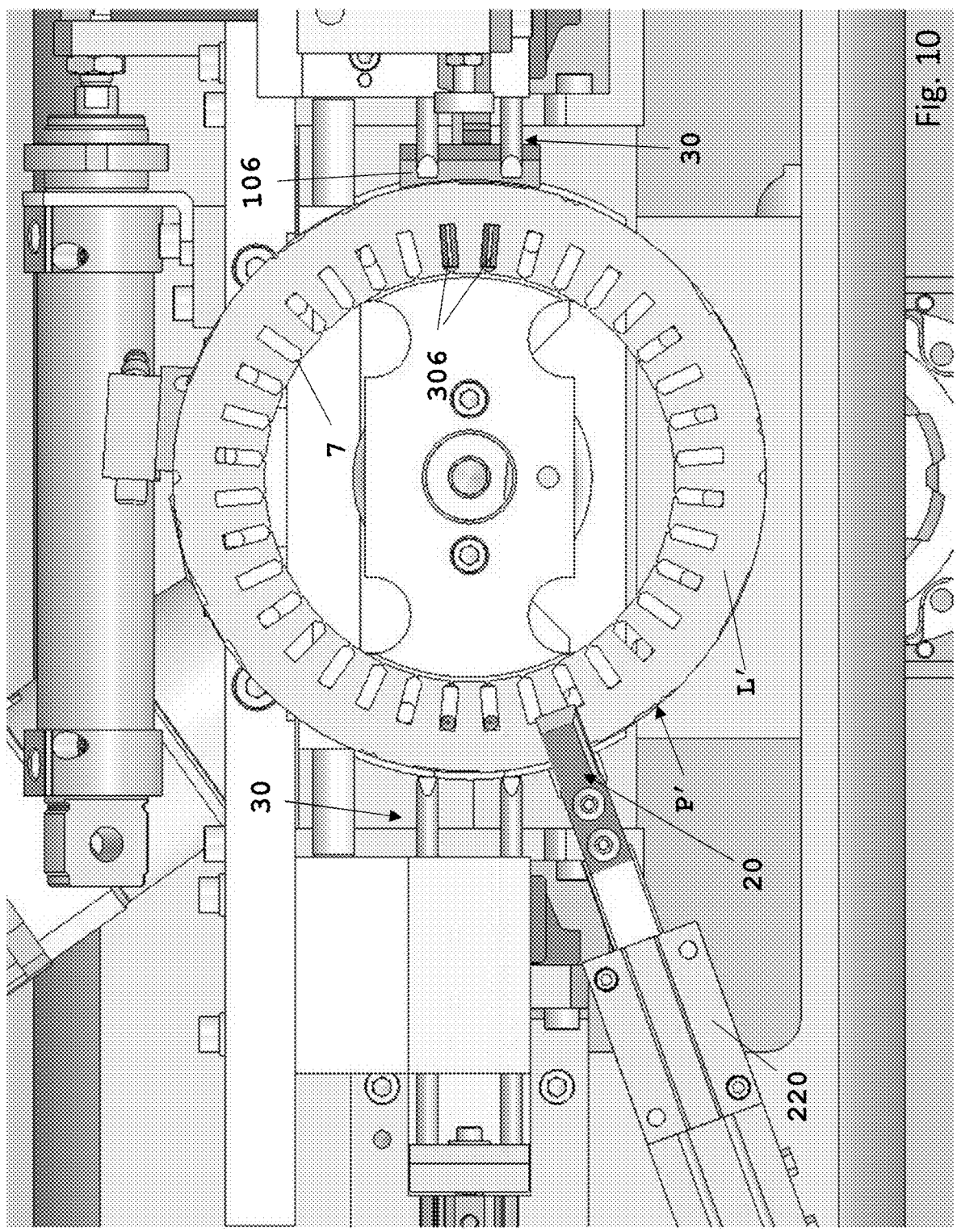
Figure 11:
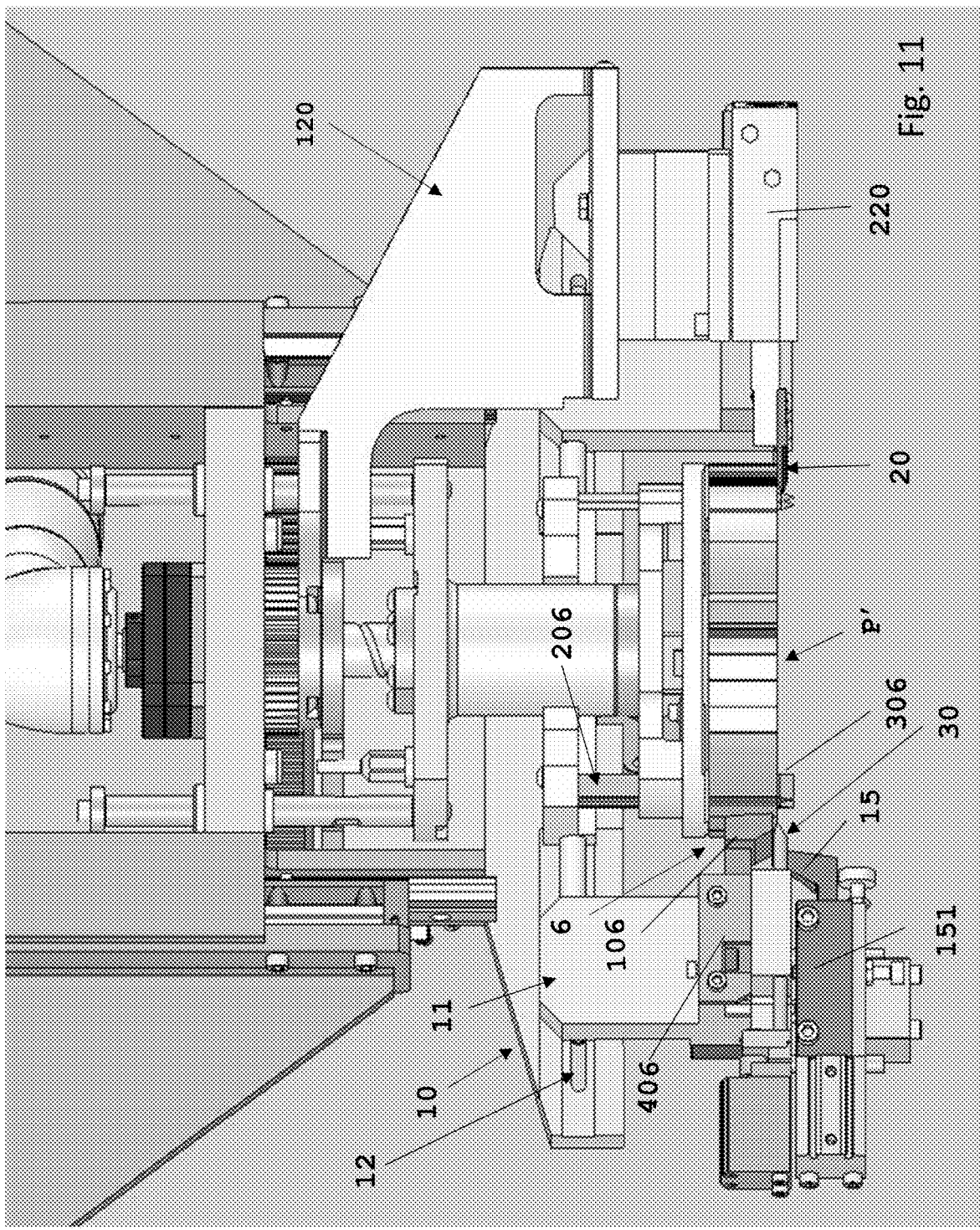

FIGS. 10 and 11 respectively show a side view and an axial view from the bottom of the step of inserting the separator knife in-between the laminations intended to return on the stack and the last lamination intended to form the lamination bundle and in which the knife has moved angularly along an angular path with predetermined angular width.

Figure 12:
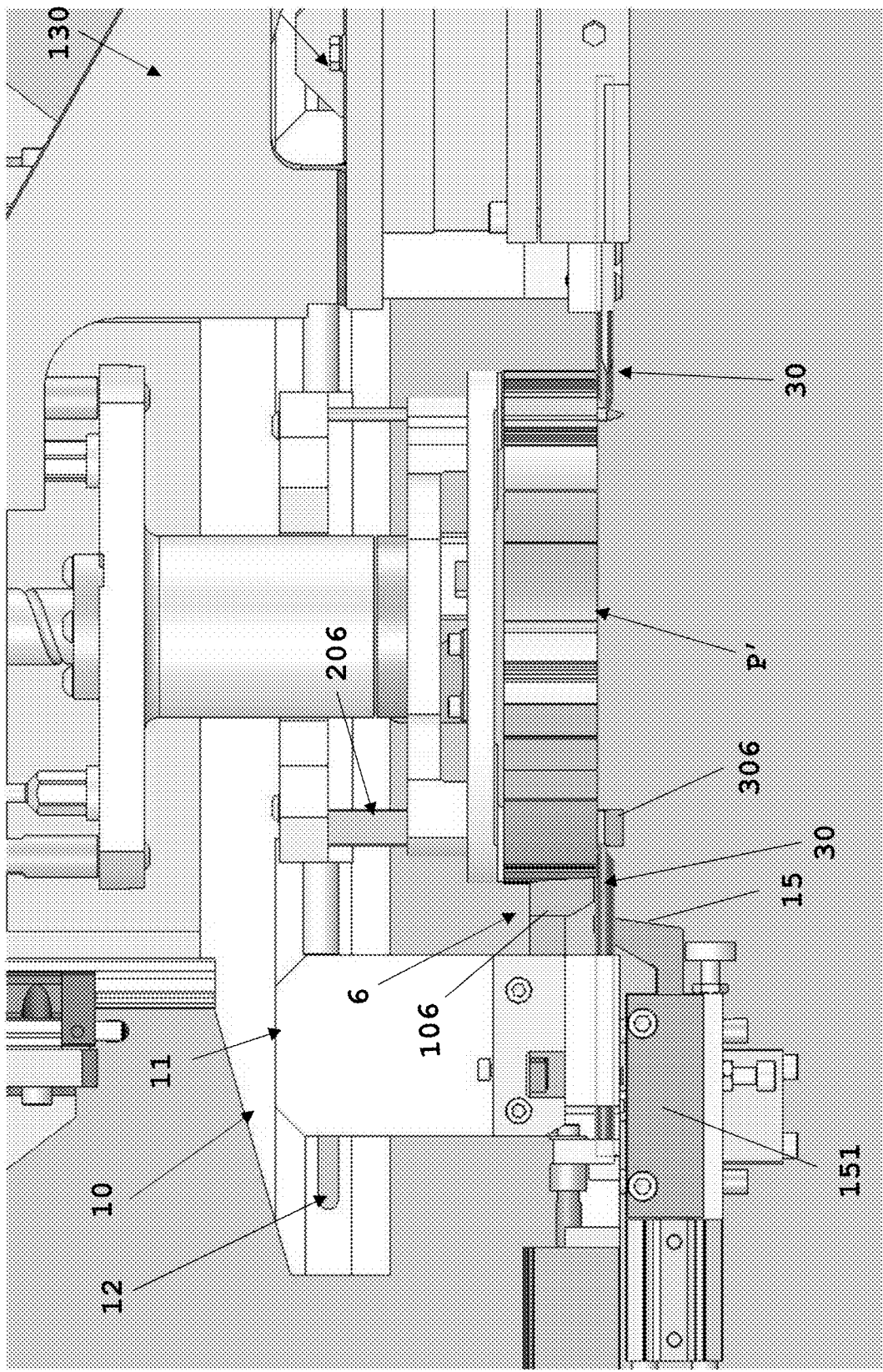

FIGS. 12 and 13 show a side view in which the lamination stack was omitted and an axial view from the bottom on the lamination bundle, in which the removable supports of the bundle were activated after the sorting and separating step for transferring the bundle to the armature assembling store, in the assembling station.

FIGS. 14A to 14F show, in a schematic and simplified way, the detaching steps of at least one lamination that erroneously remained adherent to the last lowest lamination of the lamination bundle.

Figure 1:
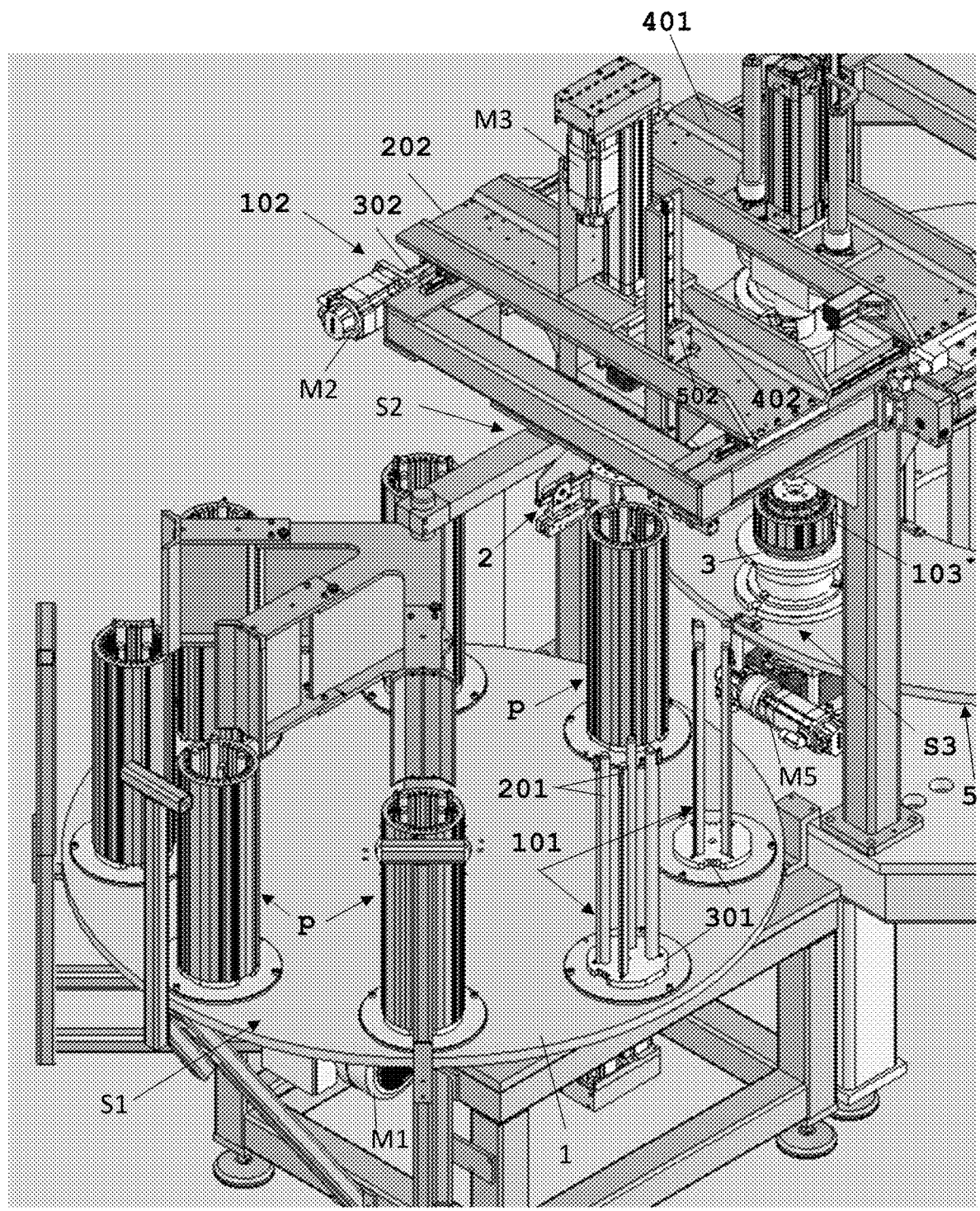
FIGS. 1 and 2 show two views of an embodiment of a plant according to the present invention respectively in perspective and in side elevation.
Figure 2:
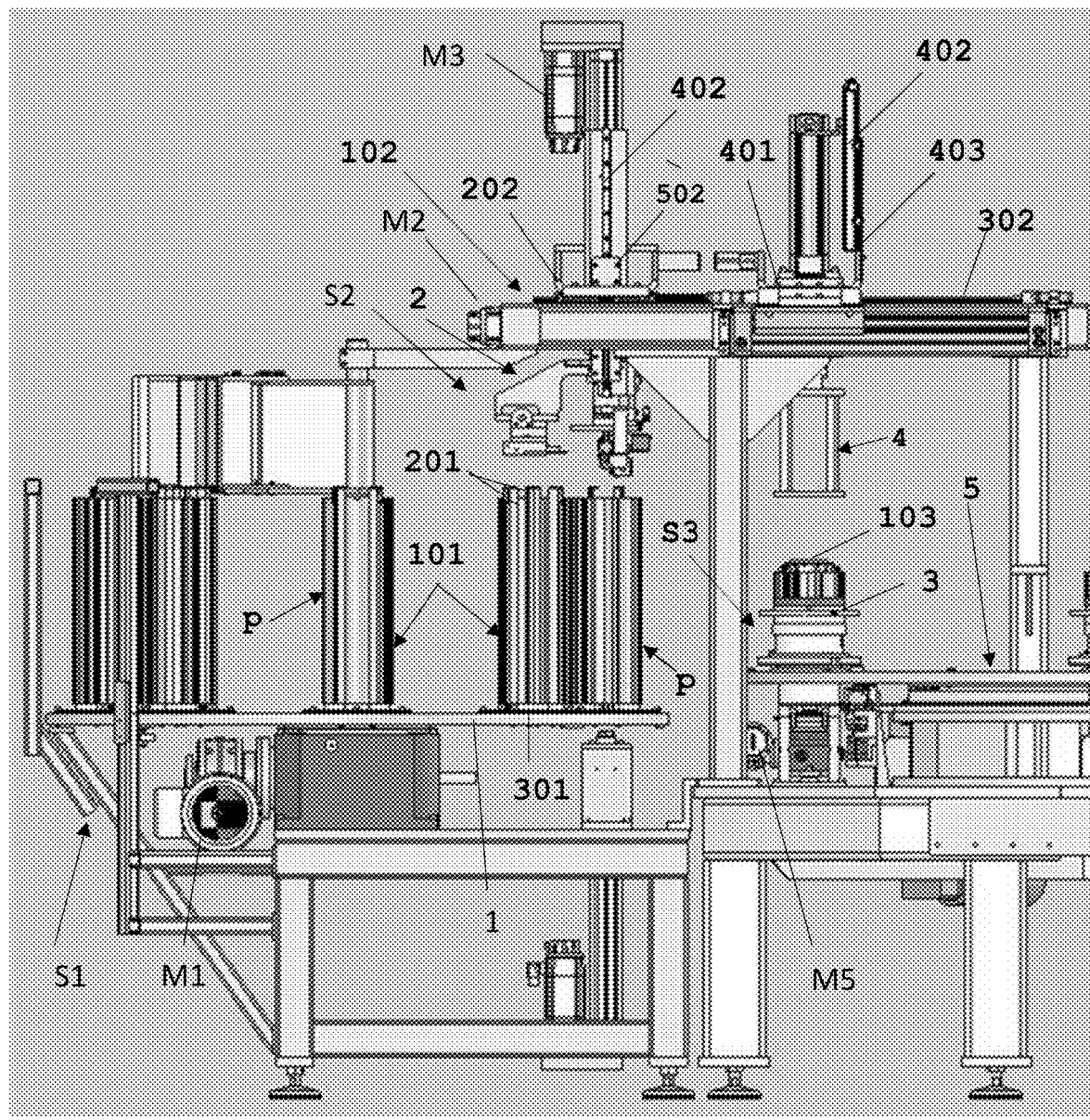

With reference to FIGS. 1 and 2, these show a plant for manufacturing armatures for electrical motors or the like. Said machine operates by selecting a number of laminations from a lamination stack, each of which is blanked from a sheet made of metal or conductive material and has an identical plan-view shape and the thickness of the sheet from which it is blanked. The single laminations are stacked in at least one store and a lamination bundle number, which is formed by a number of laminations, is selected from this stack. The lamination bundle number is calculated on the basis of the axial sizes of the armature and according to the thickness of the single laminations.

According to a first solution, the lamination bundle can comprise the number of laminations needed to reach the total axial length of the armature.

An embodiment variant instead provides to select and form the lamination bundles with a number of laminations corresponding to an inner submultiple of the total length of the armature and to overlap in register to each other the single lamination bundles thus obtained.

The laminations forming the bundle(s) needed to make the armature are then made integral to one another in a block by means of a chemical/physical connection, for example by means of a plurality of weld beads or lines oriented in axial direction of the lamination bundle(s) and provided in two or more angular positions of the outer and/or inner shell surface of the lamination bundle(s) provided for the armature.

With reference to FIGS. 1 and 2, the plant according to this exemplary embodiment comprises a feeder/conveyor to feed/convey the lamination stacks p from a loading or forming station S1 of said lamination stack p to a sorting and separating station S2 to sort/separate a lamination bundle p' from a lamination stack p.

In the embodiment shown, the feeder/conveyor consists of a rotary table 1 which is rotationally operated around its central axis by a motor M1.

According to a characteristic, the rotary table is preferably horizontal and bears a plurality of angularly equidistant stores 101 spread along itself for as many lamination stacks p.

The stores 101 comprise at least two centering guides to center the laminations of the stack P to one another and which are in the form of vertical rods 201 in the example shown. In particular, the vertical rods 201 are spread angularly equidistant and radially spaced from each other such as to cooperate as guides with the sectors of the peripheral shape of the laminations.

The shown embodiment shows laminations with the shape characteristics of the most frequent ones, but is not to be understood as limiting, since the arrangement of the guides 201 and, as will be shown below, also of the other parts cooperating with the laminations, is defined by the plan-view shape of the laminations and thus by the shape of the cross section of the shell walls of the lamination stack or bundle separated by the latter.

In the examples shown, the laminations have an annular and circular plan-view shape, and are rotationally symmetrical, in particular with reference to a given rotation angle. In this case, the guiding and centering vertical rods have a cross-like arrangement and a sectional profile corresponding, at least for a part of said cross section, to the cross section of the lamination stack, i.e. to the shape of the inner perimeter edge of the laminations, in the region in contact with the corresponding rod 201.

This way, all the laminations of a stack p are kept in a coincident position in register with each other with respect to the transverse translations at the axis of the stack and/or to angular displacements around one or more axis parallel to the axis of the stack or coincident therewith.

The rods 201 depart form a bottom wall 301.

An embodiment variant can provide that said bottom wall 301 can be raised and lowered in vertical direction, thanks to motorized actuator means not shown in detail.

In the sorting and separating station S2 to sort and separate the lamination bundles p', in a position vertically aligned with the lamination stack p, sorting/separating members, which will be described in more detail below, are provided, generically denoted by 2.

These sorting/separating members 2 are assembled together on a common frame 102. The frame 102 comprises a first carriage 202 which is radially sliding with respect to the rotation axis of the rotary table 1. The translation can take place forward and backward between said station S2 and a further assembling station S3 provided aligned along the radial translation direction of the carriage 202.

The carriage 202 is slidingly mounted with each head end on a corresponding guide 302. The forward movement is controlled by a motor M2.

A vertical track 402, which is slidingly mounted in a vertical guide 502 and operated by a motorized actuator M3, is mounted on the carriage 202.

The lower end of said track 402 bears a plurality of sorting and separating tools, which will be described in more detail below with specific exemplary embodiments.

The station S3 is provided in a radially aligned position with respect to the radial path of the carriage 202 and comprises at least one assembling store 3 which has a central centering group 103 for the lamination bundles which is shaped at least for part of its shell wall correspondingly to the inner shell wall of the lamination bundles and on which at least one lamination bundle or two or more lamination bundles are deposited.

In a position vertically aligned and/or axially coincident with the assembling store 3, i.e. with the lamination bundles deposited thereon, a presser member 4, which is also displaceable by means of a carriage 401 in radial translation direction of the carriage 202 bearing the sorting/separating members 2, is provided in the station S3.

The carriage 401 bears, similarly to the carriage 202, a slide 402 which is slidable along a guide 403 and which controls the raising from and the lowering against the lamination bundle(s) p' deposited in the assembling store 3 of said presser member 4.

As is clear in FIGS. 1 and 2, according to an advantageous embodiment, the two carriages 202 and 401 can be made so that the translations are carried out together and the strokes are combined so that, when the sorting/separating members 2 are in the station S2 in an operative position aligned with the lamination stack p present in said station S2, the presser member 4 is in operative position and vertically aligned with the assembling store 3 and the lamination bundle(s) deposited thereon. Thus, the two operations in the stations S2 and S3 can be carried out in parallel.

Instead, when the sorting/separating members are displaced to the station S3, in operative position and vertically aligned with the assembling store, for unloading a lamination bundle p' therein, the presser member 4 is displaced outside of the station S3, beyond it.

Still according to a further characteristic provided in FIGS. 1 and 2, a conveyor/feeder of a plurality of assembling stores, which are displaced between said assembling station S3 and at least one unloading station of the finished armature (not shown in the figures), is provided in combination with the station S3.

The conveyor/feeder of the exemplary embodiment shown consists of a rotary table, also horizontal, denoted by 5 and on whose peripheral band a plurality of assembling stores 3 are spread angularly spaced, similarly to the table 1 for the stores 101. A motor M5 with a transmission rotationally operates the table 5.

Still according to a further characteristic, in the station S3 or in an intermediate station between the station S3 and the unloading station (also not shown in detail), one or more welding tools are provided, not shown in detail, which carry out a weld line or bead in cross direction, preferably in a direction parallel to the axis of the lamination bundle(s) in the assembling store 3 and in pressed condition.

It is possible to provide one or more weld lines or two or more weld beads in different angular positions of the outer shell surface of the lamination bundle(s) and/or also possibly the inner one.

The welding tools can be of any type, of arc, plasma, laser or other type and are generally known in the state of the art of the sector, as well as possible supporting and displacing mechanisms along the lamination bundle(s).

Still according to a further characteristic, the sorting/separating members 2 simultaneously have the function of transferring members to transfer the lamination bundle p' selected and separated in the station S2 from this station S2 to the station S3, without needing further separate transferring members to transfer said lamination bundle p'. As will become clearer below, these sorting/separating members 2 are provided in combination with removable supports for restraining the bottom of the lamination bundle p' and which are operated after the process of selecting the laminations of the bundle p' and of separating the bundle p' from the stack p has been completed and which restrain the lamination bundle p' from the bottom during the translation displacement of the sorting/separating members 2 into the station S3 together with said removable supports for restraining the bottom of the lamination bundle p'.

Moreover, still according to a characteristic, the sorting/separating members 2 and the supports for restraining the bottom are mounted rotatable for a predetermined angle around the axis of the lamination bundle p' so that to be able to position several lamination bundles p' on the assembling store 3 with different angular positions. This allows to compensate possible thickness variations along the circumferential extension of the lamination bundles p', due for example to tolerances in terms of thickness of the single laminations. A random arrangement can lead for example to align and overlap laminations with the thicker regions in the context of tolerances, thus ultimately contributing to increase the thickness differences between different regions of the laminations. A variation of the angular arrangement of the single lamination bundles by placing them one on top of the other results in a possible compensation of this effect.

The successive FIGS. 3 to 13 show in detail the sorting/separating members generically denoted by 2 in the preceding figures.

Figure 3:
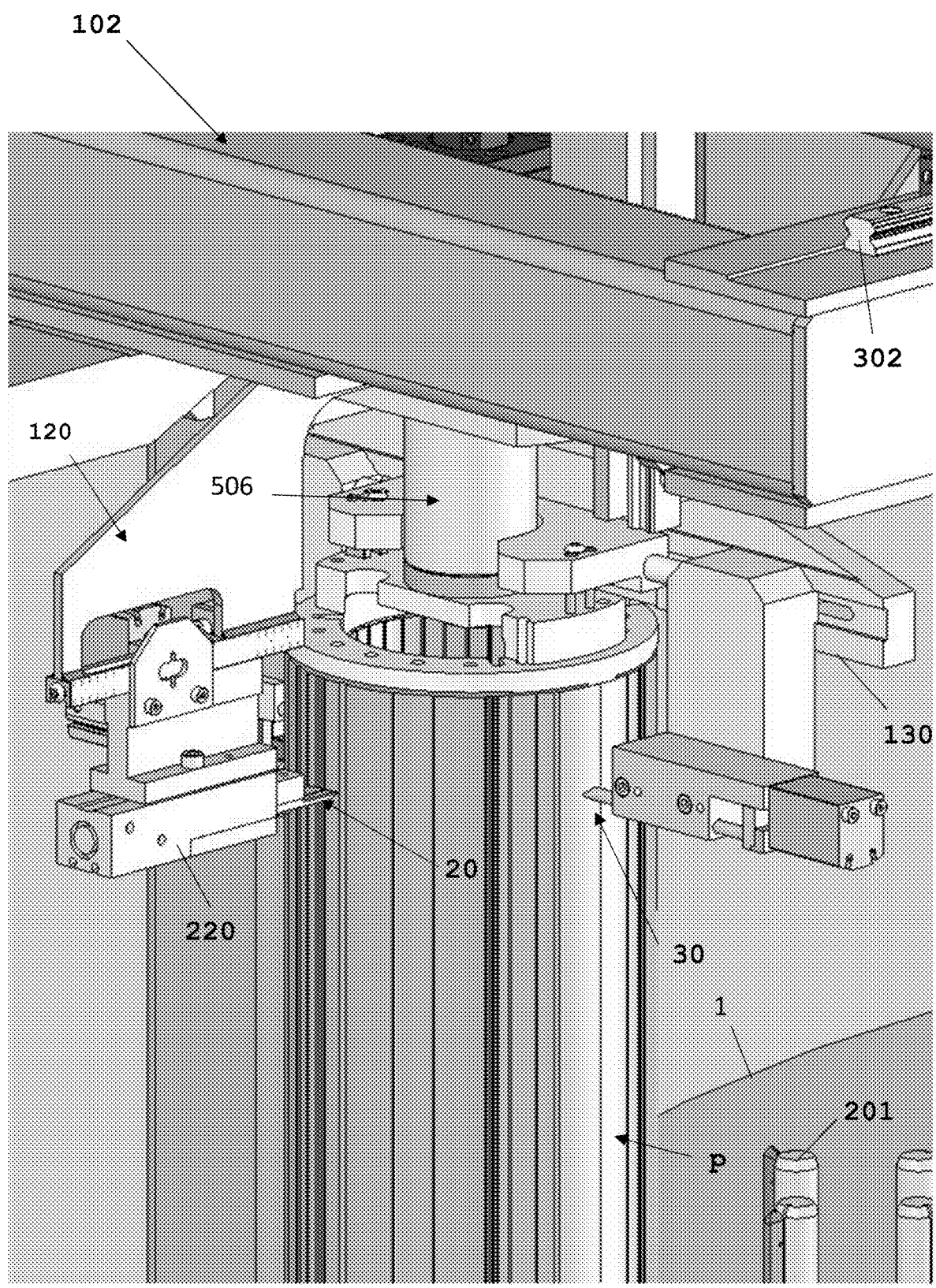
FIGS. 3 and 4 show a perspective view and a side view of the first raising step of the upper end of a lamination stack in the sorting and separating station of a lamination bundle.
Figure 4:
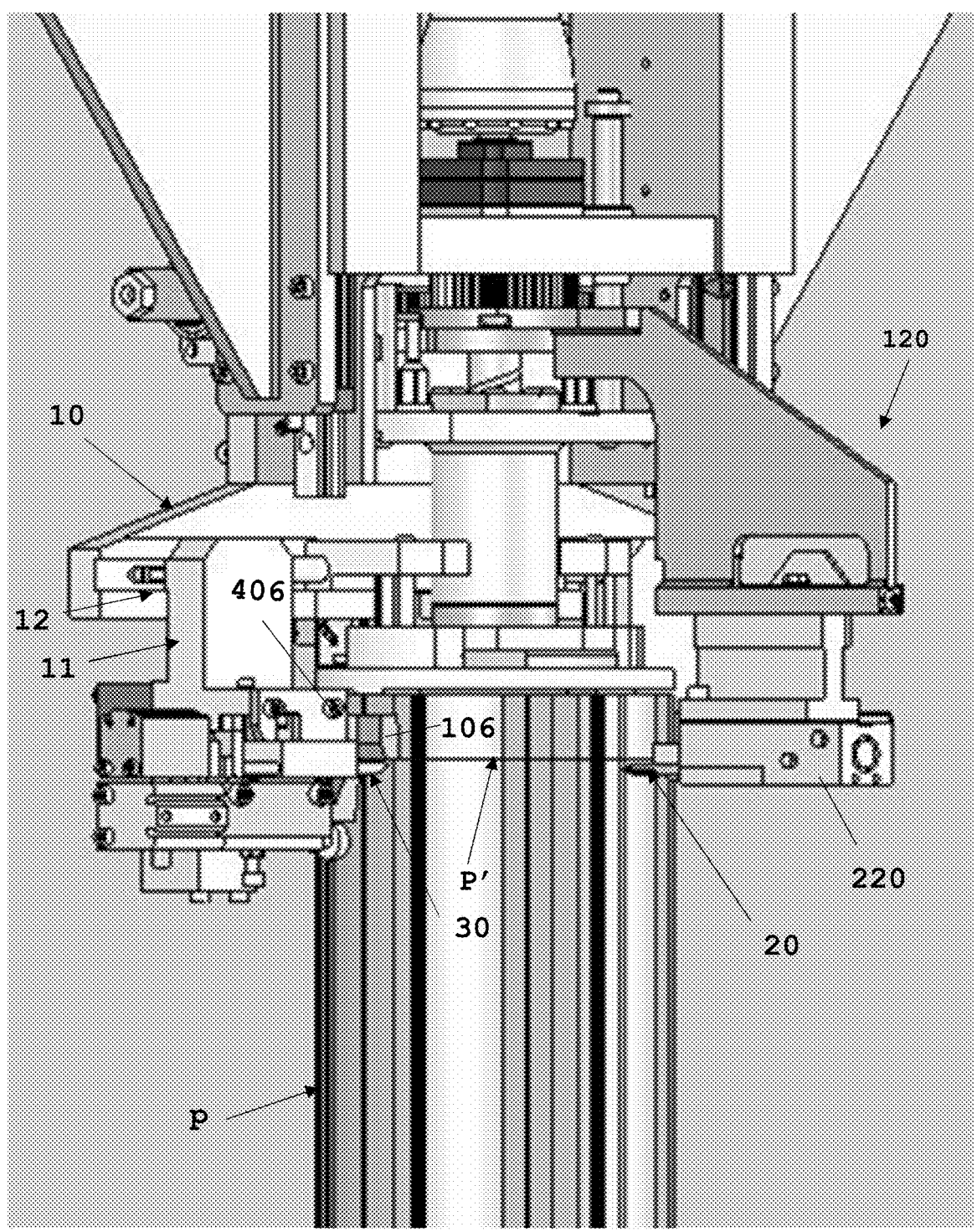

FIGS. 3 and 4 show the positioning of the lamination stack P with its upper end in the sorting and separating station. The lamination stack p can be raised vertically along the guides 101, 201 from the raisable bottom 301, or the sorting/separating members can be lowered against the upper end of said stack P or the movement takes place by translating both the stack p and the sorting/separating members.

These members comprise, in a predetermined angular position with respect to the plan-view shape of the laminations L of the stack p, i.e. the shape of the inner and outer shell surfaces of the stack p, a gripper 6 that consists of at least one outer jaw 106 and at least one inner jaw 206.

The inner jaw 206 consists of one or more matching parts which adhere by shape coupling to an axial band of a given number of laminations, starting from the upper end of the stack P.

In this example, the inner perimeter wall of the stack P, i.e. the plan-view shape of the laminations, has a plurality of radial slots and said jaws 206 form a fork with two branches 306, each of which slips by shape coupling into a different slot 7, preferably in two slots 7 near each other as more clearly shown in FIGS. 9, 10 and 13.

The outer jaw 106 is displaceable in a radial direction of the lamination stack p and has a surface in contact with an axial band of the outer shell surface which extends, in axial direction, of a height corresponding to a predetermined number of laminations and in a circumferential direction of the lamination stack so that to be radially coincident with the inner jaw 206, i.e. with the branches 306 thereof.

Figure 5:
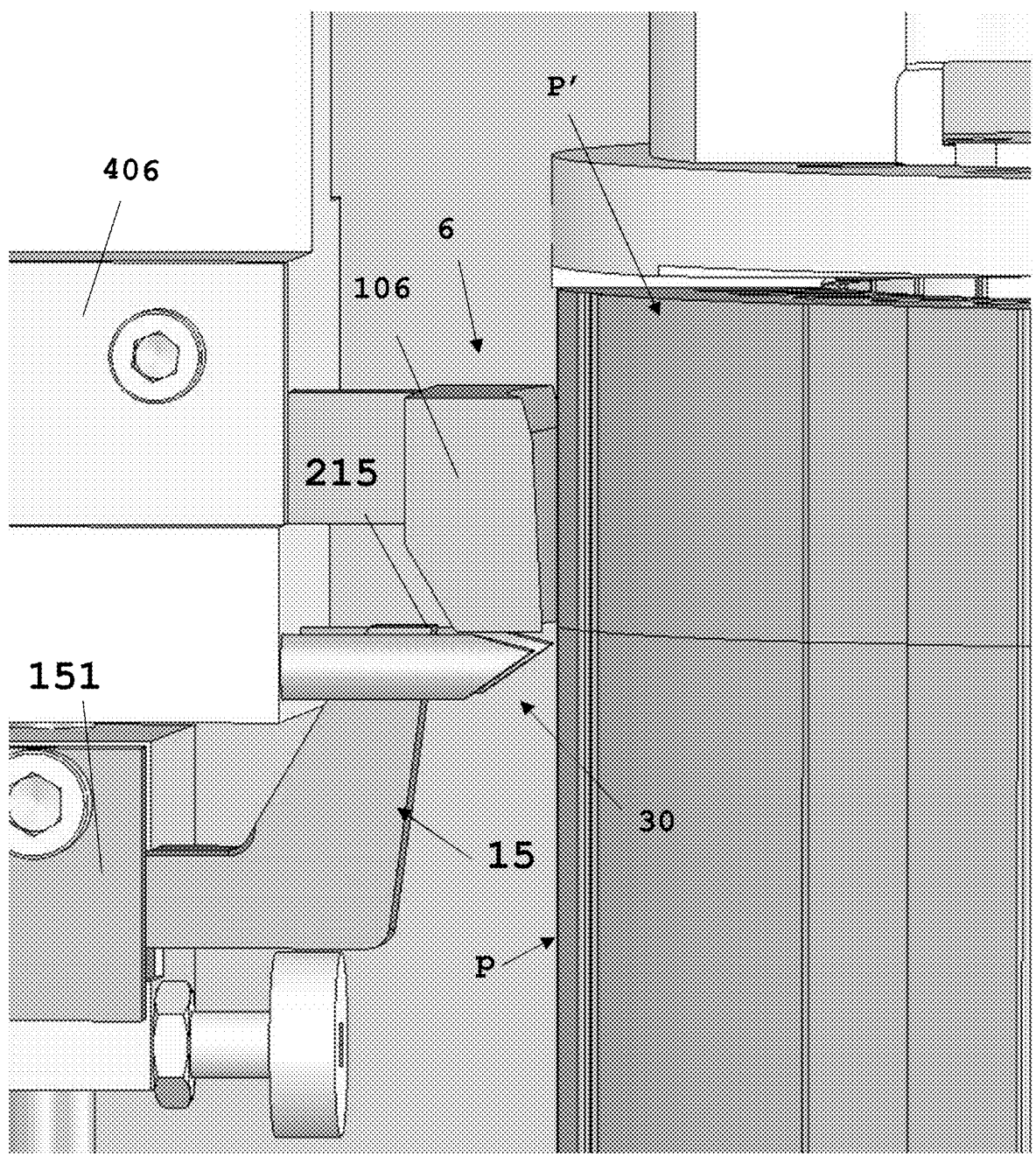
FIGS. 5 and 6 show the operating steps of the gripper, respectively in the position where it is grabbing the laminations of the bundle and in the standby step in which the jaws are spaced from the shell surface of the lamination bundle.
Figure 6:
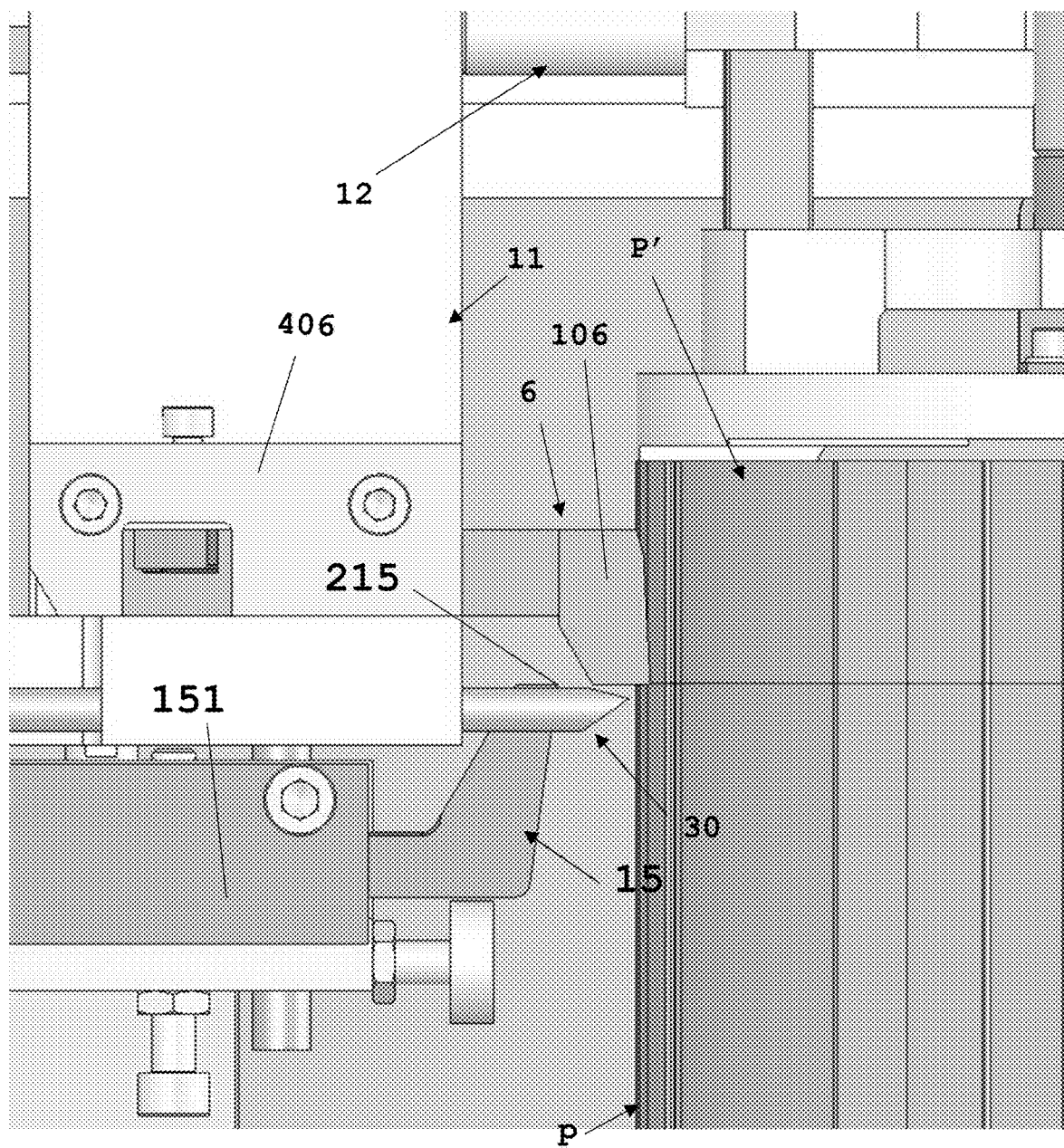
Figure 7:
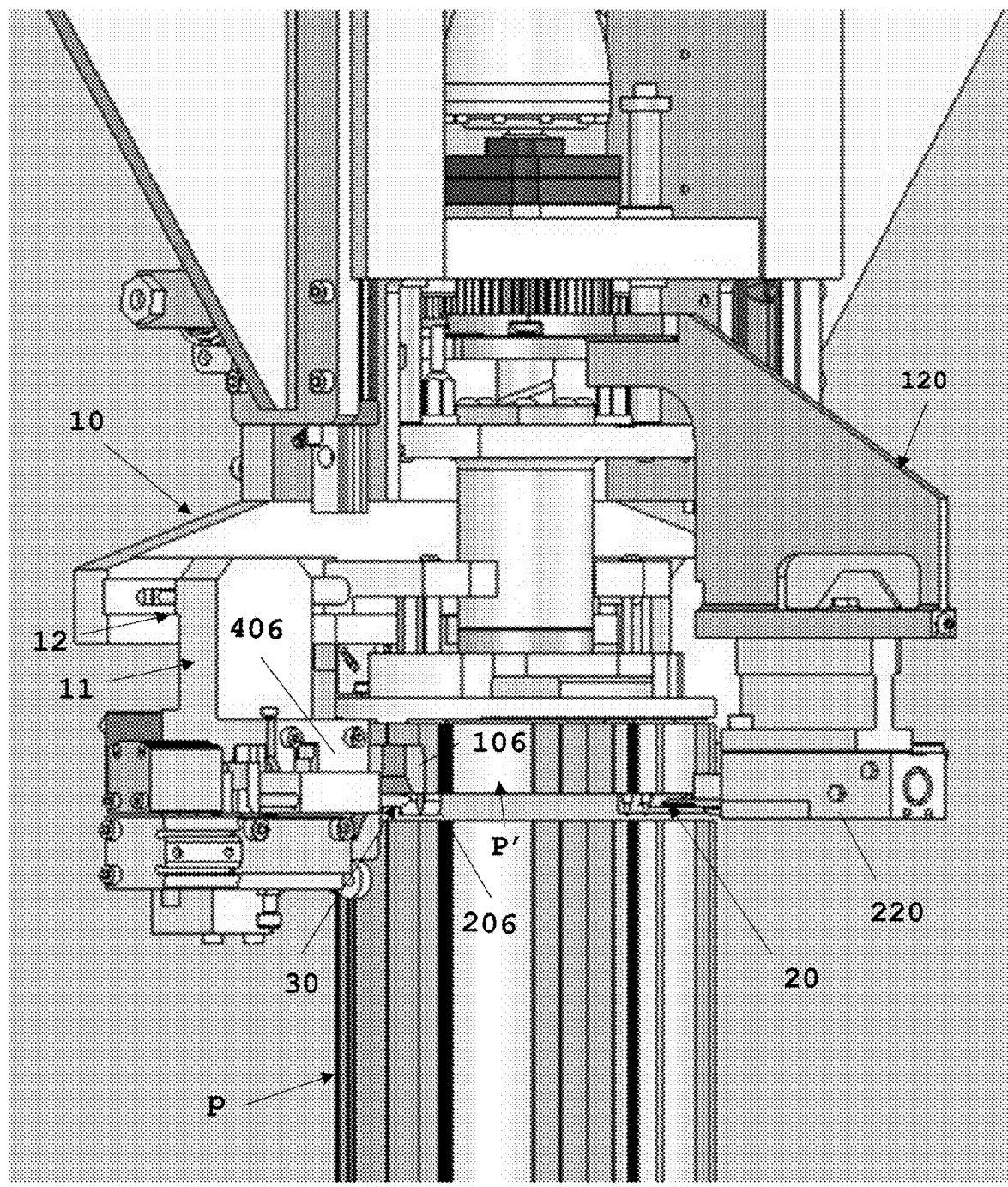
FIG. 7 shows the step of raising the bundle from the lamination stack.

FIG. 5 and FIG. 6 show enlargements of the side views of the sorting/separating members 2 in which the outer jaw 106 is respectively in a withdrawn position spaced from the shell surface of the lamination stack p and in a position adherent against said shell surface for the radial clamping of a predetermined number of laminations, which are provided in the lowest part of lamination bundle p', between it and the inner jaw 206.

The jaw 106 is supported by a radial arm 10 and is operated by a linear actuator 406 with respect to the translation of the lamination bundle p' in a radial direction and in both ways, i.e. moving away from and against the shell surface p' of said bundle.

According to a further characteristic, in order to adjust the stroke limit position of the jaw 106 with respect to the position of the lamination stack p, the linear actuator bearing the jaw 106 is mounted on the arm 10 by means of a slide 11 which is displaceable along a guide 12 parallel to said arm 10.

Directly under the jaw 106, a sorting finger 15, which is supported by the arm 10 itself and which is operated by a linear actuator 151 which displaces said finger 15 against the lamination stack in a position directly flush with the lower surface of the jaw 106, is provided.

Said finger is made with an outwardly protruding corner, so that to form a nail 215 which positions itself against the peripheral edge of a lamination possibly protruding or remained adherent to the lamination intended to be the lowest lamination of the bundle p'.

It is possible to provide different movement paths for said finger and/or said nail 215. According to a first embodiment, the finger and the corresponding nail only carry out a radial translation movement alternatively against the shell surface of the lamination stack p and in a direction moving away from said shell surface.

According to a further embodiment, once in contact with the peripheral edge of a lamination L' still erroneously adherent to the lamination L intended to form the lowest lamination of the bundle p', said finger 15 and the corresponding nail 215 perform a further downwards movement in the axial direction of the lamination bundle p'.

The relative axial position of the gripper 6 and the finger 15, i.e. of the nail 215, is prearranged in a regulatable way, but fixed, whereas the axial position of these two parts with respect to the height of the bundle p', i.e. to the upper end of the lamination stack p, is determined by the number of laminations provided for each bundle p' depending on their thickness, and the gripper 6 together with the finger 15 are positioned axially with respect to the end of the stack P, thanks to actuators which axially displace the sorting/separating and/or raising members of the lamination stack p.

The sorting/separating members further comprise a separator knife 20 which is oriented with the cutting edge parallel to the lamination faces and which is supported by a radial arm 120. The radial arm 120 is rotatably mounted around a rotation axis that is parallel to or coincident with the axis of the lamination stack P in the station S2, i.e. of the lamination bundle p'. Moreover, the knife is mounted on the radial arm 120 by means of a slide 220 which is displaceable in a longitudinal direction of said arm, i.e. in a radial direction with respect to the rotation axis of said arm, between two end positions, a more radially outwards position, in which the end of the cutting edge of the knife 20 is spaced from the outer shell surface of the lamination stack p or the lamination bundle p', and a separating position, in which said separator knife 20 is interposed between the face of the lamination L intended to form the last lamination of the selected bundle p' and a lamination or the first lamination that remained erroneously adherent to said last lamination and which is intended to form the first upper lamination of a successive lamination bundle p'.

Following the detaching action of the finger 15 and of the respective nail 215, applied on a lamination that erroneously remained adherent to the last lowest lamination L of the bundle p', the knife 20 is moved forward in radial direction towards the rotation axis of the arm 120 such as to penetrate under said last lamination 1 of the bundle p' and under the lamination that remained erroneously adherent to the latter. Subsequently, the arm 120 is rotated around its axis and the knife progressively separates said lamination L' that remained erroneously adherent to the one 1 intended to form the last lamination of the bundle p', by gradually proceeding from an initial angular position to a final angular position of the angular displacement path.

Thanks to this action of the separator knife 20, regions of said lamination L' that erroneously remained adherent to the lamination L intended to form the last lowest lamination of the bundle p', in which the action of the finger and the nail 15, 215 was not sufficient to fully separate said two laminations from each other, are effectively separated.

FIGS. 8 to 11 show side and plan views from below, in an axial direction of the lamination bundle p' of the separator knife 20, respectively in the first angular position and in the final angular position.

After reaching the final angular position, the knife 20 is removed from the bundle p' by means of a radial outwards translation and is rotated again to the initial angular position.

As is clear in the figures, in the embodiment shown, the angular path of the knife 20 is coaxial with the symmetry axis of the lamination bundle p', since in this example the plan-view shape of the laminations is rotationally symmetrical.

Given the possibility of a combined radial and angular displacement, the path of the knife 20 can also adapt itself to other plan-view shapes of the laminations, by also carrying out combined displacements in a radial direction contextually with the angular displacement.

In particular, by being able to define a ring-shaped path along a circumference that inscribes the outer profile of a lamination, whatever it may be, the separator knife 20 can be operative with any plan-view shape of laminations L.

The sorting/separating members 2, in particular according to the embodiment of FIGS. 12 and 13, have a further removable lower restraining member which is operated at the end of the separation of the process for separating the lamination L' still erroneously adherent to the lamination intended to form the last lowest lamination L of the lamination bundle p' by means of the separator knife 20.

The embodiments shown provide that such members respectively consist of two forks 30. These are carried by radial arms 10, 130 to diametrically opposite positions with respect to the axis of the lamination bundle p' or of the lamination stack or to an axis parallel thereto. Advantageously, one of the radial arms consists of the arm 10 bearing the outer jaw 106 of the gripper 6 and the detacher/scraper finger 15 with the nail 215. In this case, the fork 30 mounted on the same arm 10 of the gripper 6 is arranged astride the detacher/scraper finger 15, i.e. said finger is housed in the intermediate space between the two branches of said fork 30.

Said two forks, diametrically opposite to each other, are radially displaceable between two positions, a standby position in which they are radially spaced from the lamination bundle p', and a restraining or supporting position in which they are radially displaced one towards the other or towards the median axis of the lamination bundle p' and they overlap on the lowest side of the last lamination L of the lamination bundle p'. The radial displacement takes place thanks to linear actuators mounted on the corresponding arm 10, 130.

According to a further characteristic, the various radial arms are all preferably mounted coaxial with each other, while the gripper 6 is rotatably mounted on a shaft 506 coaxial with the axis of the lamination bundle p', so that to allow the variation of the angular position between two lamination bundles p' to be deposited on the same assembling store 3.

The further radial arms can remain stationary or also rotate together, thus all forming a sorting and separating head of a lamination bundle p'.

With regard to the embodiments described, the indicated actuators and motors can each be of any type selected among electromechanical, electric, pneumatic, hydraulic actuators or combinations thereof.

Moreover, as in the case of any automatic machine or plant, also in this case, the actuators are controlled by an electronic control unit. An advantageous embodiment provides for using an electronic unit comprising a processor, at least one memory, at least one user input/output interface, at least one interface and control unit to interface and control one or more of the actuators, a control program being loaded in the memory and executed by the processor, in which the instructions for controlling the actuators, correspondingly to the functions of the members operated by them, are encoded and to the performing of said functions in a reciprocally synchronized way, according to the processing steps provided.

FIGS. 14A to 14F show, in an extremely schematized way, the processing steps for sorting and separating a lamination bundle p' from a lamination stack p.

Figure 14A:
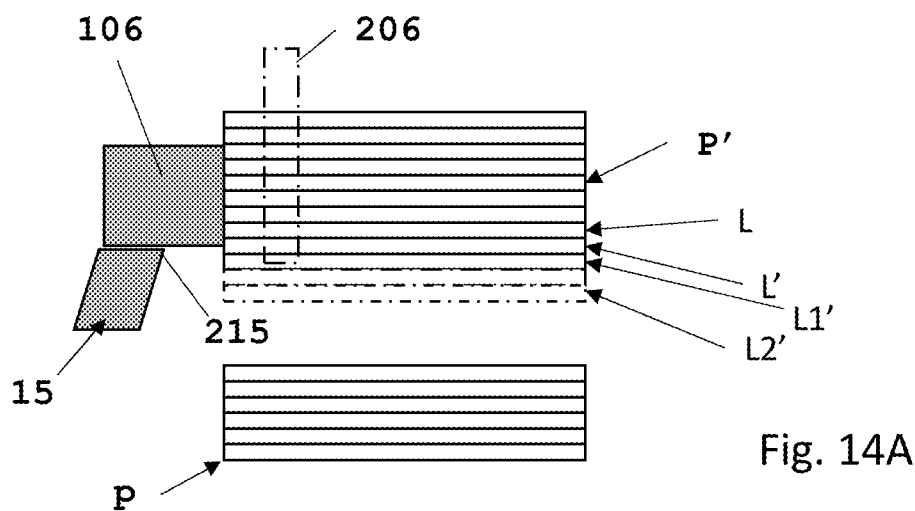

In FIG. 14A, the lamination stack is brought to the sorting and separating station S2 and positioned with respect to the gripper 6 and to the outer 106 and inner 26 jaws correspondingly to the height of the lamination bundle p', i.e. to the number of laminations needed to form it.

Due to for example thickness tolerances, a lamination L' remains erroneously adherent to the lamination L correctly intended to form the last lamination of the bundle p'.

As denoted by dashed and dotted lines, also further one or more laminations L1', L2' can remain erroneously adherent to this lamination L'.

Once the laminations are clamped by the gripper 6, the stack P of remaining laminations is axially moved away and to a predetermined extent from the lamination bundle p' to which the lamination L', and the potential further laminations L1' and L2', remain however adherent.

Figure 14B:
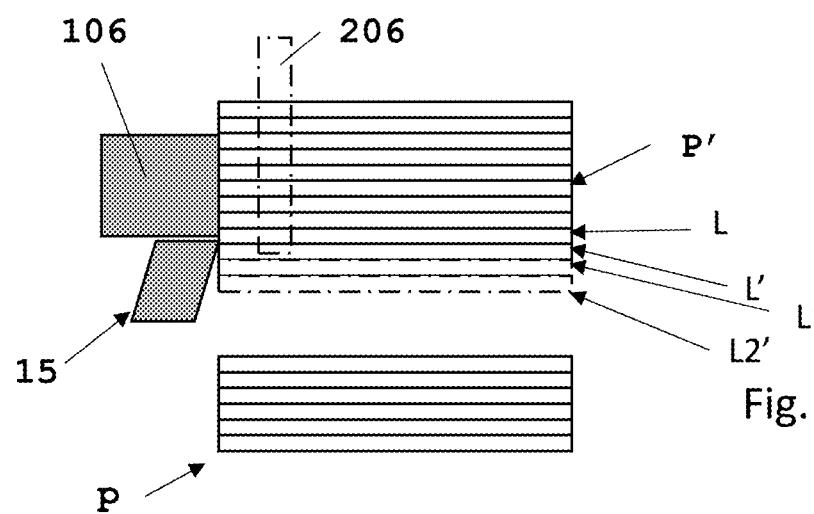
Figure 14C:
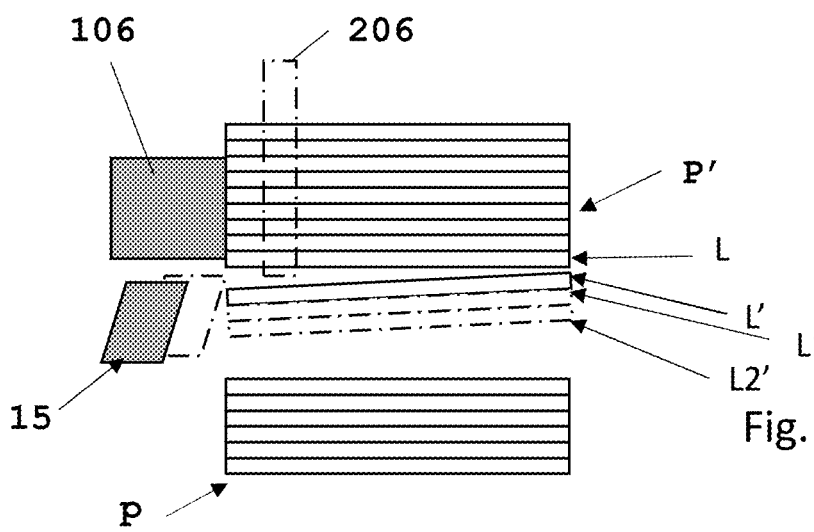

In FIG. 14b, the detacher/scraper finger 15 shaped so that to form the nail 215, is operated and brought into contact with the peripheral edge of the lamination L' erroneously clamped in the region protruding beyond the lowest side of the outer jaw 106 of the gripper 6. This action, possibly connected with a successive movement of the finger 15 in an axial downwards direction, i.e. in an axial direction moving away from the lamination L of the lamination L', causes a detachment of the lamination L', at least in the region of the shell surface of the lamination bundle p' coincident with said finger 15. In the more remote regions, the lamination L' can remain adherent to the lamination L by bonding, due to lubricants or annealing or other reasons.

Figure 14D:
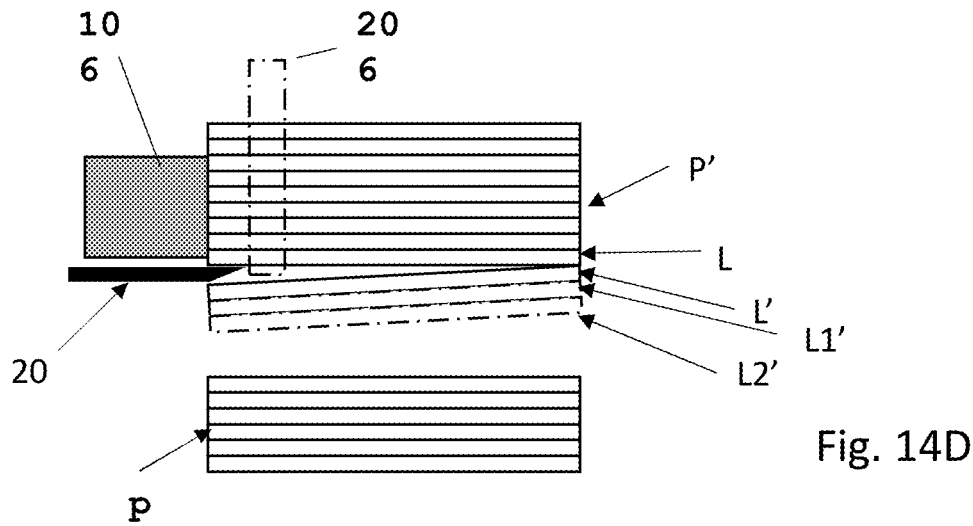
Figure 14E:
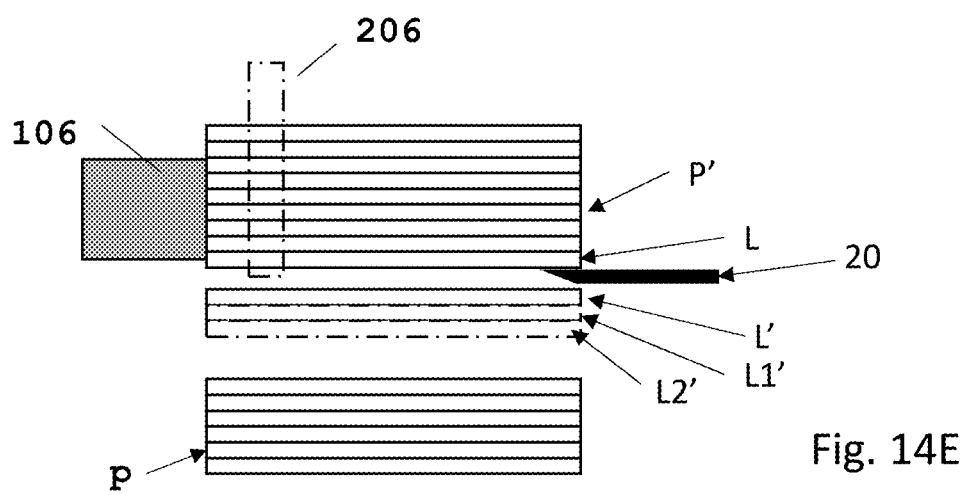
Figure 14F:
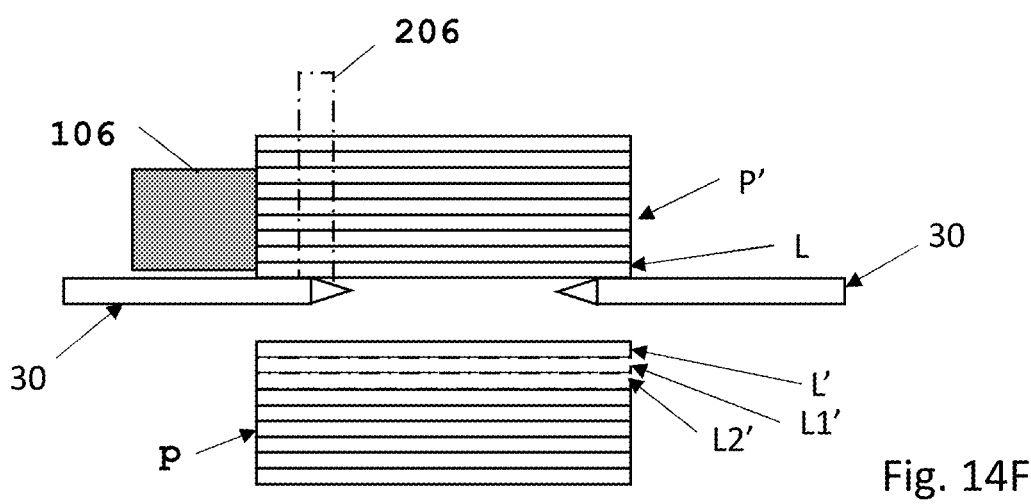

As shown in FIG. 14D the separator knife, provided directly side by side to the gripper 6 and to the detacher/scraper finger 15, is radially moved forward in a position of interposition between the lamination L intended to correctly form the last lamination of the bundle p' and the lamination L' spaced from the lamination L by means of the detacher/scraper finger 15 of the separator knife 20.

The separator knife 20 is then moved forward by means of a rotation around an axis coaxial with the axis of the lamination bundle p' or parallel to the latter, until reaching an angular position spaced from the latter and essentially almost diametrically opposed. This angular displacement of the separator knife 20 causes the certain and complete detachment of the lamination L' from the lamination L, and the latter, as well as the potential further underlying laminations L1' and L2', fall by gravity on the upper end of the lamination stack p.

The alignment is ensured by the vertical guides 301 of the store 101 and by possible further vertical guides 40 and/or also by the inner jaws 206 of the gripper 6. The further axial guides 40 provided in combination with the sorting/separating members and/or the inner jaws 206 of the gripper 6 can be prolonged to a predetermined extent beyond the lowest side of the separated lamination bundle p' and can thus ensure an alignment of the lamination L' and/or the laminations L1' and L2' with the vertical guides 301 of the underlying store 101 housing the lamination stack p from which the bundle p' was separated.

Thanks to the method and device according to the present invention, an extremely precise sorting of the number of laminations forming each bundle p' that eliminates or compensates, at least partially, errors due to the thickness tolerances of the laminations and/or to the undesired adhesions of one or more laminations to the lowest lamination of a bundle p', is achieved.

The presence of the separator knife allows to avoid that, when the laminations have great surface extensions, the effect of the detacher/scraper finger remains limited to the region in which it operates on the lamination or to nearby regions, whereby the lamination to be separated remains adherent to the lamination bundle p' in other regions of its extension which are spaced from the one coincident with the region of intervention of the detacher finger.

The separator knife and the function thereof do not introduce complexity and important slowing down into the sorting and separating process of the lamination bundles and the integration of the method and the device in a plant for manufacturing armatures of electric machines allows to make up for potential time extensions, thanks to operative flow steps, due to the action of the separator knife.

The invention claimed is:

1. A method for automatically forming bundles of metal laminations by automatic precision dosing of a lamination bundle includes picking up and separating a preset number of laminations, based on a preset height of the lamination bundle, from a lamination stack higher than said lamination bundle, the method comprising the following steps:
   grabbing, at one end of the lamination stack, the preset number of laminations corresponding to a height of the lamination bundle;
   separating said preset number of laminations of the lamination bundle from said lamination stack by axially moving the lamination bundle away from the lamination stack by a preset distance;
   detaching one or more last laminations at an end of said lamination bundle facing the lamination stack, the one or more last laminations having remained adherent to a lamination of the lamination bundle intended to be last, said one or more last laminations being clamped by a part of a thickness of the one or more lamination or being attached to the one or more laminations to be last; and
   collecting said one or more detached laminations in a position axially aligned with the laminations of said lamination stack,
   wherein the step of detaching comprises two successive steps:
   a first step of partially detaching by scraping in a direction of moving away the one or more laminations at the end of said lamination bundle facing the lamination stack, the scraping taking place along an axial direction of the lamination bundle and at a single region of a lamination perimeter, thereby forming a gap spacing the one or more laminations from the lamination intended to form the last lamination of the lamination bundle, the gap only partially extending along a perimetrical extent of the laminations; and
   a second step of completely detaching said one or more laminations at the end of said lamination bundle facing the lamination stack, the second step taking place first by introducing a separator knife between the lamination bundle and said one or more potential laminations at the end of said lamination bundle facing the lamination stack in said gap, and then by moving said separator knife along a part of the lamination perimeter.

2. The method according to claim 1, wherein moving the separator knife comprises moving the separator knife along a path corresponding to a part of the lamination perimeter, said part ranging from at least one-quarter and at most one half of an extent of said lamination perimeter.

3. The method according to claim 1, wherein the laminations have a rotationally symmetrical perimeter, a knife path being performed along an arc of a circle coaxial with an axis of rotationally symmetrical perimeter.

4. The method according to claim 1, wherein the lamination stack is vertically oriented, and wherein the lamination bundle is picked up from an upper end of said lamination stack, said one or more laminations remained adherent to the lamination bundle being collected by falling due to gravity on the upper end of the lamination stack.

5. The method according to claim 1, further comprising the step of holding in position the last lamination of the lamination bundle after separating the one or more laminations adherent against the lamination bundle.

6. The method according to claim 1, wherein each lamination bundle constitutes a partial bundle of total number of laminations intended to form an armature, a plurality of said lamination bundles being formed in succession and said lamination bundles being stacked in mutual congruent and/or coaxial positions in order to form the armature.

7. The method according to claim 6, wherein the laminations have rotational symmetry for a predetermined rotation angle, each lamination bundle being overlapped on a previous lamination bundle after having been rotated with respect to said previous lamination bundle around a symmetry axis by said rotation angle or a plurality of said rotation angles.

8. A device for automatically forming bundles of metal laminations, to form armatures of electrical machines, through the method according to claim 1, the device comprising:
   at least one vertical store for the at least one lamination stack of laminations in overlapped condition;
   a sorting and separating station for the lamination bundle having a predetermined number of laminations;
   a translator of said lamination stack with at least one end in said sorting and separating station;
   said sorting and separating station comprising a gripper for radially clamping the lamination bundle adapted to be switched alternatively in a first state, in which at least part of the laminations of the lamination bundle are clamped, and a second state of not interfering with the laminations;
   translators of either said gripper relative to the lamination stack and/or the lamination stack relative to said gripper for positioning said gripper relative to the end of said lamination stack according to the predetermined number of laminations of the lamination bundle; and
   a nail or a detacher finger movable along a path, by which said detacher finger or said nail separates one or more laminations that incorrectly adhere to another lamination of the lamination bundle intended to be a last lamination of said lamination bundle, said one or more laminations being clamped by a part of their thickness or being glued to the last lamination while being instead intended to be a first lamination of the lamination stack facing the separated lamination bundle,
   wherein:
   said nail or said detacher finger cooperates with an axial band of a perimeter of the laminations of the lamination bundle coincident with only one point of the perimeter of said laminations,
   a separator knife is provided and supported to be movable in a radial direction with respect to an axis of the lamination bundle or the lamination stack and in a position coincident with or placed side by side with said axial band of the perimeter, the separator knife is supported to be angularly movable around the axis of the lamination bundle or the lamination stack over a path along at least part of the perimeter of said laminations, and a plan-view shape of said laminations is inscribable in a circle, whereas said separator knife is supported to be angularly movable on a path corresponding to an arc of a circle coaxial with an axis of said circle;

further comprising a control unit, which operates said translators, said gripper, said nail or said detacher finger and said separator knife, and which runs a control program comprising instructions for carrying out the method according to claim 1.

9. The device according to claim 8, wherein the sorting and separating station is provided at an upper end of the lamination stack, at a predetermined distance therefrom.

10. The device according to claim 9, wherein the translators comprises a bottom wall of a vertical store for the lamination stack, the bottom wall being slidingly mounted on vertical guides and being operated by a translation actuator for sliding in a vertical direction both ways.

11. The device according to claim 8, wherein the sorting and separating station has an upper support from which supporting arms radially depart outwards respectively of the gripper radially clamping the lamination bundle, of the nail or the detacher finger and the separator knife.

12. The device according to claim 11, wherein the supporting arm of the separator knife is configured to be angularly rotated around an axis either coincident with a central axis of the lamination stack or the lamination bundle or parallel to the central axis of the lamination stack or the lamination bundle, a carriage being mounted on said supporting arm, the carriage sliding along a slide guide oriented in a longitudinal direction of said arm, further comprising an actuator configured to translate said carriage along said guide between two ending positions, one of which is radially outward and in which a free tip of the separator knife is spaced from a shell surface of the lamination bundle and another one of which, radially inward, in which the separator knife protrudes by a predetermined length in interposing position between two adjacent laminations of the lamination bundle.

13. The device according to claim 8, wherein the device is configured to be used in combination with ring-shaped laminations and in which the gripper of the lamination bundle comprises a first jaw radially outside a shell wall of said lamination bundle and a second, opposite jaw radially inside a radially inner shell surface of the lamination bundle, said first and the second jaws having a surface that contacts corresponding inner and outer shell surfaces and has predetermined angular length partial with respect to an angular extent of a shell surface and is correspondingly shaped, the first and the second jaws being radially displaceable to a first position, in which they clamp in-between the lamination bundle, and to a second position in which they are spaced from each other and from the corresponding inner and outer shell surfaces.

14. The device according to claim 8, further comprising removable supports of the lamination stack, the removable supports being activated after both a separation stroke of the separator knife and a radial displacement of the separator knife away from the lamination bundle have been performed, said removable supports comprising a plurality of radial teeth arranged in different angular positions, with respect to an axis of an outer shell surface of the lamination stack or the lamination bundle and radially displaceable, together, by translation actuators, in overlapping position to overlap a face of the last lamination of the lamination bundle and in radially outward spaced position, with respect to the outer shell surface of the lamination stack and/or the lamination bundle.

15. The device according to claim 14, wherein said plurality of radial teeth are each mounted on a radial arm and supported on slide guides fixed to said radial arm and oriented in a longitudinal direction and are controlled in two sliding ways along a corresponding guide by a translation actuator.

16. The device according to claim 14, wherein the gripper of the lamination bundle, the nail or the detacher finger, the separator knife and the plurality of radial teeth of the removable supports with their supporting arms, the translation guides and translation and rotation actuators are supported together by a common supporting frame, which is mounted with slide guides and slide actuators so as to be displaceable between the sorting and separating station of the lamination bundle and an assembling station of an armature of an electric machine, which comprises a plurality of laminations whose number is at least equal to or greater than a number of laminations provided in a bundle.

17. The device according to claim 16, wherein the laminations have rotational symmetry by a predetermined rotation angle, so as to allow, when forming an armature comprising a plurality of lamination bundles, while the assembly comprising the gripper to grab the lamination bundle, the nail or the detacher finger, the separator knife and the plurality of radial teeth being removable and supporting the lamination bundle with the respective supporting arms, the translation guides and the translation and rotation actuators, is further mounted on a motorized rotational support, which is designed so as to rotate said assembly around a rotation axis coincident with a symmetry axis of the plurality of lamination bundles, so as to allow each lamination bundle to be overlapped on a previous bundle after having been rotated with respect to said previous bundle around the symmetry axis by said rotation angle or a full multiple thereof.

18. A plant for producing armatures, comprising:

a feeder for a series of lamination stacks, which moves said lamination stacks from a loading station of said lamination stacks to a sorting and separating station of lamination bundles;

transferring members to transfer the lamination bundles from the sorting and separating station to an assembling station to assemble a plurality of lamination bundles in an armature of electrical machine, wherein a plurality of lamination bundles are arranged axially aligned and coincident with each other, one on top of the other, said assembling station comprising:

a store for assembling the armature, the armature comprising one or more lamination bundles, the store being equipped with centering guides for laminations;

an axial presser of the laminations of a lamination bundle or the plurality of lamination bundles unloaded in the store;

a tool for stable connection of the laminations of the lamination bundles present in the store and in pressed condition one with respect to the other;

said tool being supported so as to be displaceable along guides parallel to an axis of the lamination bundles and/or on guides radial with respect to said axis, alternatively to a working distance and a standby distance; and a grabber/conveyor for unloading said lamination bundles after a stable and mutual connection of the laminations with each other, wherein, at the sorting and separating station of the lamination bundles, a device for automatic formation of metal lamination bundles is provided, comprising:

at least one vertical store for at least one lamination stack of laminations in overlapped condition;

a sorting and separating station for a lamination bundle having a predetermined number of laminations;

a translator of said lamination stack with at least one end in said sorting and separating station;

said sorting and separating station comprising a gripper for radially clamping the lamination bundle adapted to be switched alternatively in a first state, in which at least part of the laminations of the lamination bundle are clamped, and a second state of not interfering with the laminations;

translators of either said gripper relative to the lamination stack and/or the lamination stack relative to said gripper for positioning said gripper relative to the at least one end according to the predetermined number of laminations of the lamination bundle; and a nail or a detacher finger movable along a path, by which said detacher finger or said nail separates one or more laminations that incorrectly adhere to another lamination of the lamination bundle intended to be a last lamination of said lamination bundle, said one or more laminations being clamped by a part of their thickness or being glued to the last lamination while being instead intended to be a first lamination of the lamination stack facing the separated lamination bundle, wherein:

said nail or said detacher finger cooperates with an axial band of a perimeter of the laminations of the lamination bundle coincident with only one point of the perimeter of said laminations, a separator knife is provided and supported to be movable in a radial direction with respect to an axis of the lamination bundle or the lamination stack and in a position coincident with or placed side by side with said axial band of the perimeter, and the separator knife is supported to be angularly movable around the axis of the lamination bundle or the lamination stack over a path along at least part of the perimeter of said laminations;

further comprising a control unit, which operates said translators, said gripper, said nail or said detacher finger and said separator knife.

19. The plant according to claim 18, wherein the feeder of the lamination stacks comprises a rotary table, on which a plurality of angularly equidistant vertical stores are spread, each for the lamination stack, whereas, in different angular positions, the rotary table transfers said stores, one by one, in a feeding/forming station to feed/form the lamination stack to a store and to the sorting and separating station.

20. The plant according to claim 18, wherein the assembling station comprises a rotary table, on which a plurality of angularly equidistant assembling stores are spread having an axis parallel to a rotation axis of said rotary table, the plurality of assembling stores for assembly of armatures of electrical machines being formed by one or more of the lamination bundles, each store being translated by a rotation of the rotary table from the assembling station to an unloading station to unload a finished armature from a corresponding assembling store, the unloading station comprising the grabber/conveyor and being positioned at an angular position different from the assembling station with reference to the rotation of the rotary table.

* * * * *